United States Patent
Lee et al.

(10) Patent No.: US 10,701,649 B2
(45) Date of Patent: Jun. 30, 2020

(54) METHOD FOR TRANSMITTING SYNCHRONIZATION SIGNAL USING CODEBOOK IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/773,423

(22) PCT Filed: Oct. 6, 2016

(86) PCT No.: PCT/KR2016/011174
§ 371 (c)(1),
(2) Date: May 3, 2018

(87) PCT Pub. No.: WO2017/078279
PCT Pub. Date: May 11, 2017

(65) Prior Publication Data
US 2018/0324730 A1    Nov. 8, 2018

Related U.S. Application Data

(60) Provisional application No. 62/251,061, filed on Nov. 4, 2015.

(51) Int. Cl.
*H04W 56/00* (2009.01)
*H04B 7/06* (2006.01)
(Continued)

(52) U.S. Cl.
CPC ...... *H04W 56/0015* (2013.01); *H04B 7/0456* (2013.01); *H04B 7/0486* (2013.01);
(Continued)

(58) Field of Classification Search
CPC .. H04B 7/0413; H04B 7/0456; H04B 7/0486; H04B 7/0617; H04B 7/0634;
(Continued)

(56) References Cited

U.S. PATENT DOCUMENTS 7,822,442 B2    10/2010    Jin et al.
9,225,478 B2*   12/2015    Chen ............... H04W 72/046
(Continued)

FOREIGN PATENT DOCUMENTS

CN    102710309 A    * 10/2012
CN    105493547 A    *  4/2016    ........... H04W 16/28
(Continued)

OTHER PUBLICATIONS

Huawei et al., "Codebook for up to 16 Ports 2D Antenna Arrays," 3GPP TSG RAN WG1 Meeting #82, R1-153796, Beijing, China, Aug. 24-28, 2015, 8 pages.

*Primary Examiner* — Eric Nowlin
(74) *Attorney, Agent, or Firm* — Birch, Stewart, Kolasch & Birch, LLP

(57) ABSTRACT

Disclosed are a method for transmitting a synchronization signal and a base station therefor, the method comprising: generating a codebook including a second precoder defined by concatenation of first precoders, which corresponds to a plurality of antenna subarrays, respectively; generating a synchronization sequence by multiplying, by a weight, the same reference sequence input over a plurality of time intervals, for each antenna subarray; and repeatedly transmitting a synchronization signal generated by applying the second precoder to the generated synchronization sequence,
(Continued)

through the plurality of antenna subarrays, wherein the reference sequence is different for each of the plurality of antenna subarrays, and a combination of the reference sequence and the weight indicates additional information transmitted to a terminal.

8 Claims, 24 Drawing Sheets

(51) Int. Cl.
    *H04J 11/00*     (2006.01)
    *H04B 7/0456*     (2017.01)
    *H04W 48/08*     (2009.01)

(52) U.S. Cl.
    CPC ......... *H04B 7/0617* (2013.01); *H04B 7/0634* (2013.01); *H04B 7/0639* (2013.01); *H04B 7/0691* (2013.01); *H04J 11/0069* (2013.01); *H04W 48/08* (2013.01)

(58) Field of Classification Search
    CPC . H04B 7/0639; H04B 7/0691; H04J 11/0069; H04W 16/28; H04W 48/08; H04W 56/00; H04W 56/001; H04W 56/0015
    See application file for complete search history.

(56) References Cited

U.S. PATENT DOCUMENTS

| | | | |
|---|---|---|---|
| 9,749,103 B2 * | 8/2017 | Stirling-Gallacher | ......................... H04L 5/0048 |
| 9,813,123 B2 * | 11/2017 | Nam | ..................... H04B 7/0478 |
| 10,305,660 B2 * | 5/2019 | Seol | ........................... H04B 7/26 |
| 10,333,605 B2 * | 6/2019 | Su | ........................... H04B 7/04 |
| 10,405,318 B2 * | 9/2019 | Einhaus | ............... H04B 7/0456 |
| 10,476,563 B2 * | 11/2019 | Stirling-Gallacher | ......................... H04B 7/0695 |
| 10,512,008 B2 * | 12/2019 | Deenoo | ................... H04W 8/22 |
| 10,516,462 B2 * | 12/2019 | Wu | ..................... H04B 7/0482 |
| 2009/0268910 A1 * | 10/2009 | Liu | ..................... H04J 11/0079 380/268 |
| 2010/0074244 A1 * | 3/2010 | Luo | ....................... H04L 5/0007 370/343 |
| 2010/0074343 A1 * | 3/2010 | Gaal | ..................... H04L 27/261 375/259 |
| 2010/0272040 A1 * | 10/2010 | Nam | .................... H04J 13/0077 370/329 |
| 2011/0134867 A1 * | 6/2011 | Lee | ....................... H04L 5/0023 370/329 |
| 2011/0228748 A1 * | 9/2011 | Han | ..................... H04B 7/0669 370/335 |
| 2011/0249713 A1 * | 10/2011 | Hammarwall | ....... H04B 7/0634 375/220 |
| 2012/0087230 A1 * | 4/2012 | Guo | ....................... H01Q 3/267 370/208 |
| 2013/0057432 A1 | 3/2013 | Rajagopal et al. | |
| 2013/0064239 A1 | 3/2013 | Yu et al. | |
| 2013/0157667 A1 * | 6/2013 | Nakamura | ........... H04L 5/0048 455/440 |
| 2015/0288438 A1 | 10/2015 | Maltsev et al. | |
| 2016/0134352 A1 * | 5/2016 | Stirling-Gallacher | .... H04L 1/00 370/329 |
| 2016/0198474 A1 * | 7/2016 | Raghavan | ......... H04W 72/0466 370/335 |
| 2016/0212631 A1 * | 7/2016 | Shen | ................... H04W 56/001 |
| 2016/0226640 A1 * | 8/2016 | Seol | ........................ H04B 7/26 |
| 2016/0337916 A1 * | 11/2016 | Deenoo | ............. H04W 36/0094 |
| 2016/0373175 A1 * | 12/2016 | Harrison | .............. H04B 7/0469 |
| 2017/0033856 A1 * | 2/2017 | Su | ........................... H04B 7/04 |
| 2017/0033904 A1 * | 2/2017 | Stirling-Gallacher | ........................ H04L 5/0048 |
| 2017/0149480 A1 * | 5/2017 | Kakishima | ............... H04J 11/00 |
| 2017/0181134 A1 * | 6/2017 | Niu | ...................... H04B 17/318 |
| 2017/0332368 A1 * | 11/2017 | Einhaus | ............... H04B 7/0608 |
| 2018/0131420 A1 * | 5/2018 | Faxer | ................... H03M 7/3068 |
| 2019/0081682 A1 * | 3/2019 | Wu | ........................ H04L 5/0048 |
| 2019/0089428 A1 * | 3/2019 | Bethanabhotla | ..... H04B 7/0452 |
| 2019/0123803 A1 * | 4/2019 | Raghavan | ............ H04B 7/0639 |
| 2019/0341976 A1 * | 11/2019 | Nam | ............ H04B 7/0478 |
| 2019/0387504 A1 * | 12/2019 | Jung | .................. H04W 72/042 |

FOREIGN PATENT DOCUMENTS

| | | |
|---|---|---|
| WO | WO 2014/135506 A1 | 9/2014 |
| WO | WO 2014/198037 A1 | 12/2014 |

* cited by examiner (a)  (b)

(a)    (b)

FIG. 15
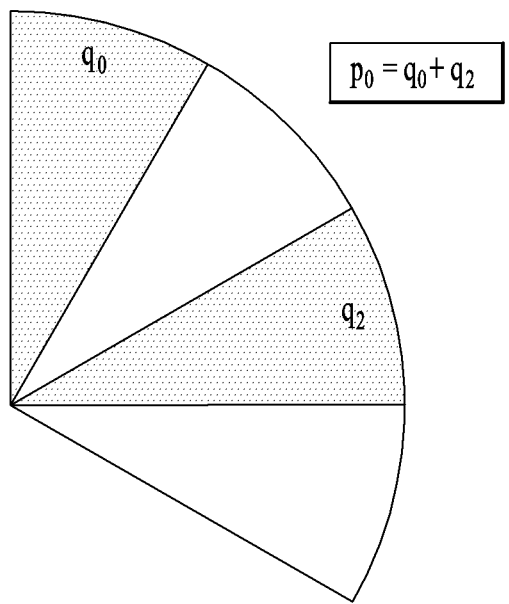
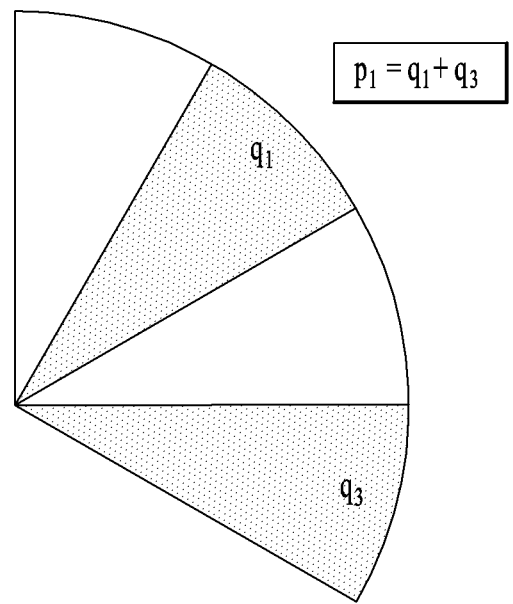
(a)  (b)

FIG. 17
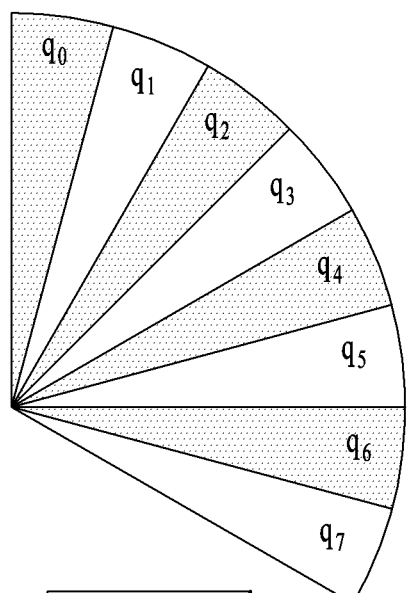
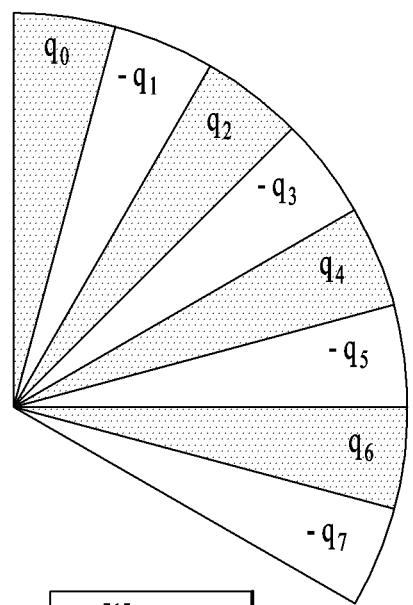
(a)    (b)

(a) 0th time slot  (b) 1st time slot  (c) 2nd time slot  (d) 3nd time slot

0th time slot    1st time slot

0th time slot    1st time slot $$\begin{bmatrix} S_{i_0} & S_{i_1} & S_{i_2} & S_{i_3} \\ S_{i_0} & -S_{i_1} & S_{i_2} & -S_{i_3} \\ S_{i_0} & S_{i_1} & -S_{i_2} & -S_{i_3} \\ S_{i_0} & -S_{i_1} & -S_{i_2} & S_{i_3} \end{bmatrix}$$

antenna subarray ↑
→ time slot

FIG. 35

$$\begin{array}{ll} \text{Sequence} & \text{OCC} \end{array}$$

Sector I : $\{s_1, s_2, s_3, s_4\}, \{++++\}$

Sector II : $\{s_5, s_6, s_1, s_2\}, \{+-+-\}$

Sector III : $\{s_3, s_4, s_5, s_6\}, \{++--\}$

Sector IV : $\{s_1, s_2, s_3, s_4\}, \{+--+\}$

Sector V : $[\{s_5, s_6\}, \{++++\}], [\{s_1, s_2\}, \{++--\}]$

Sector VI : $[\{s_3, s_4\}, \{+-+-\}], [\{s_5, s_6\}, \{+--+\}]$

METHOD FOR TRANSMITTING SYNCHRONIZATION SIGNAL USING CODEBOOK IN WIRELESS COMMUNICATION SYSTEM

CROSS REFERENCE TO RELATED APPLICATIONS

This application is the National Phase of PCT International Application No. PCT/KR2016/011174, filed on Oct. 6, 2016, which claims priority under 35 U.S.C. 119(e) to U.S. Provisional Application No. 62/251,061, filed on Nov. 4, 2015, all of which are hereby expressly incorporated by reference into the present application.

TECHNICAL FIELD

Following description relates to a wireless communication system, and more particularly, to a method of transmitting a synchronization signal using a codebook for the synchronization signal in a wireless LAN system and an apparatus therefor.

BACKGROUND ART

An ultrahigh frequency wireless communication system based on mmWave is configured to operate at a center frequency of several GHz to several tens of GHz. Due to the characteristic of the center frequency, a pathloss may considerably occurs in a radio shadow area. Since it is necessary to stably transmit a synchronization signal to all terminals belonging to the coverage of a base station, it is necessary to design and transmit a synchronization signal in consideration of a potential deep-null phenomenon capable of being occurred due to the characteristic of the ultrahigh frequency band in the mmWave communication system.

DISCLOSURE OF THE INVENTION

Technical Tasks

An object of the present invention is to improve efficiency of a synchronization procedure by enhancing the synchronization procedure between a base station and a UE in a wireless communication system.

Another object of the present invention is to improve performance of a precoder applied to a synchronization sequence by providing a codebook for transmitting a synchronization signal.

The other object of the present invention is to improve performance of a synchronization procedure and minimize the increase of complexity of a receiving UE.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting a synchronization signal, which is transmitted by a base station via an antenna array in a wireless communication system, includes the steps of generating a codebook configured by second precoders, which is defined by concatenation of a plurality of first precoders corresponding to each of a plurality of antenna subarrays, generating a synchronization sequence by multiplying the same reference sequence, which is inputted over a plurality of time slots, by a weight for each of the plurality of the antenna subarrays, generating a synchronization signal for the plurality of the antenna subarrays by applying the second precoder to the generated synchronization sequence, and repeatedly transmitting the synchronization signal defined in the plurality of the time slots via the plurality of the antenna subarrays. In this case, the reference sequence is different according to the plurality of the antenna subarrays and a combination between the reference sequence and the weight indicates additional information transmitted to a user equipment.

The weight is commonly applied to a sector which is a region corresponding to the antenna array and a different weight can be applied to a different sector.

The weight is identically applied to a part of the plurality of the antenna subarrays only and a different weight can be applied to the remaining part of the plurality of the antenna subarrays.

A reference sequence applied to the plurality of the antenna subarrays may also be different from an antenna subarray of a different antenna array adjacent to the antenna array.

The additional information can include at least one selected from the group consisting of cell ID information of the base station, frequency band information, and system information.

Each of the plurality of the antenna subarrays is independently controlled by the first precoder and may perform beamforming of the synchronization signal.

Each of the plurality of the antenna subarrays may correspond to an RF (radio frequency) chain of the base station.

To further achieve these and other advantages and in accordance with the purpose of the present invention, according to a different embodiment, a base station transmitting a synchronization signal via an antenna array in a wireless communication system includes a transmitting unit, a receiving unit, and a processor configured to operate in a manner of being connected with the transmitting unit and the receiving unit, the processor configured to generate a codebook configured by second precoders, which is defined by concatenation of a plurality of first precoders corresponding to each of a plurality of antenna subarrays, the processor configured to generate a synchronization sequence by multiplying the same reference sequence, which is inputted over a plurality of time slots, by a weight for each of the plurality of the antenna subarrays, the processor configured to generate a synchronization signal for the plurality of the antenna subarrays by applying the second precoder to the generated synchronization sequence, the processor configured to repeatedly transmit the synchronization signal defined in the plurality of the time slots via the plurality of the antenna subarrays. In this case, the reference sequence is different according to the plurality of the antenna subarrays and a combination between the reference sequence and the weight indicates additional information transmitted to a user equipment.

Advantageous Effects

According to embodiments of the present invention, the following effects are expected.

First of all, it is able to improve efficiency of a synchronization procedure by enhancing the synchronization procedure between a base station and a UE in a wireless communication system.

Second, it is able to improve performance of a precoder by designing a codebook applied to a synchronization signal.

Third, it is able to improve performance of a synchronization procedure and minimize the increase of complexity of a receiving UE.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIGS. 14 to 17 are diagrams illustrating a synchronization signal transmission structure according to a further different embodiment.

FIGS. 35 and 36 are diagrams for explaining a synchronization procedure and a beam scanning procedure according to a further different embodiment of the present invention.

BEST MODE

Mode for Invention

Figure 1:
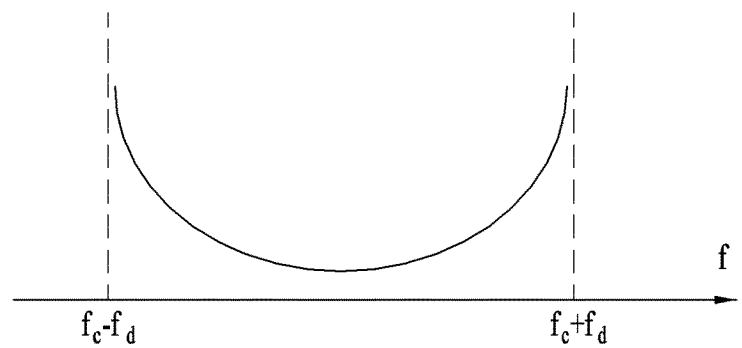
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and λ means a wavelength of a center frequency of a radio wave which is transmitted. θ means an angle between the radio wave and a moving direction of the UE. Hereinafter, description will be given on the assumption that θ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
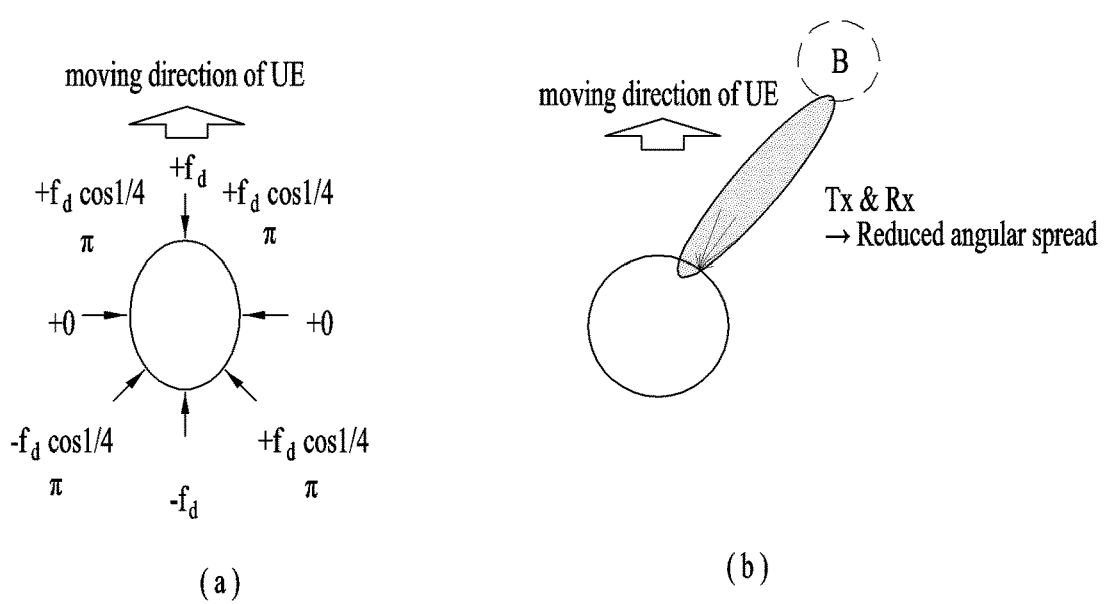
FIG. 2 is a diagram illustrating narrow beamforming related to the present invention.
Figure 3:
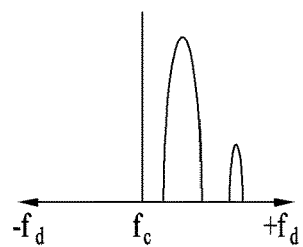
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
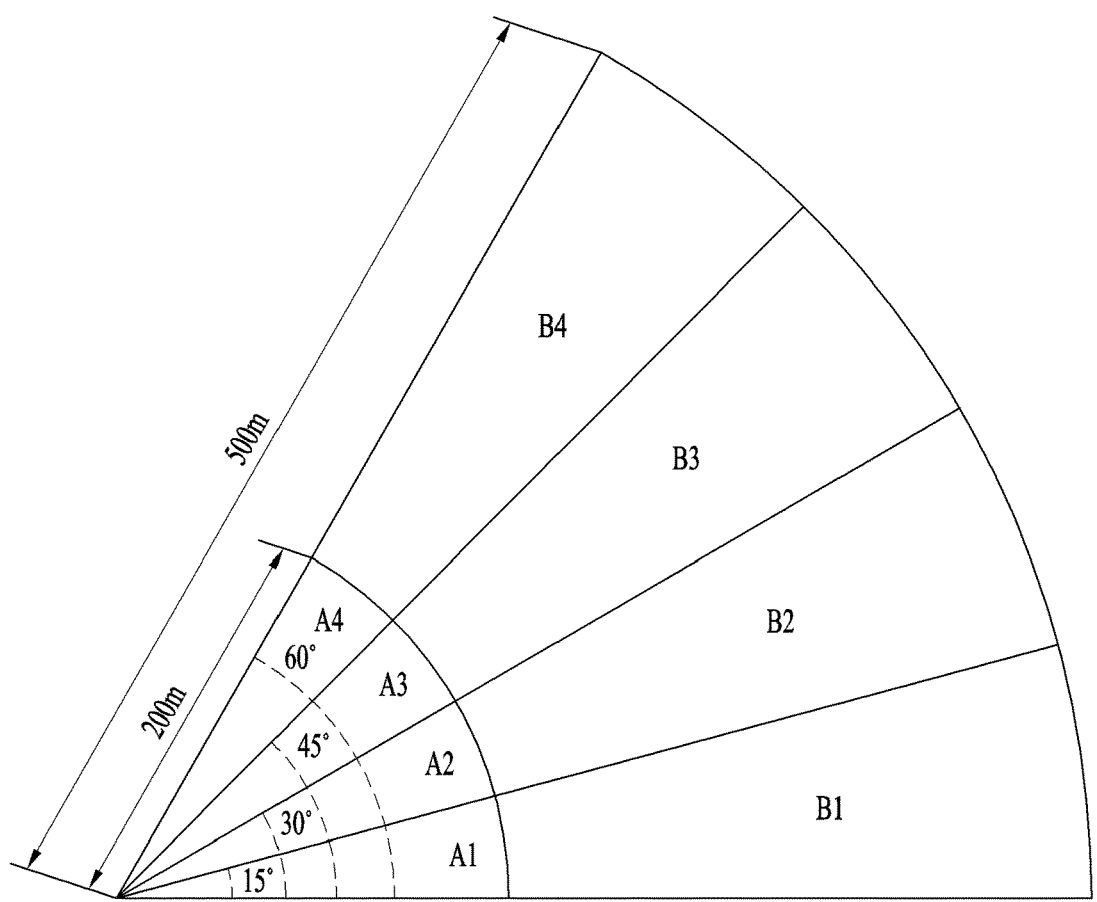
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization procedure, timing and frequency are synchronized between the base station and the UE. In order to enable UEs in a specific cell to receive and use a synchronization signal in a synchronization procedure, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2} W$$

$$\text{SINR} \to M^2 \text{SINR} \quad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
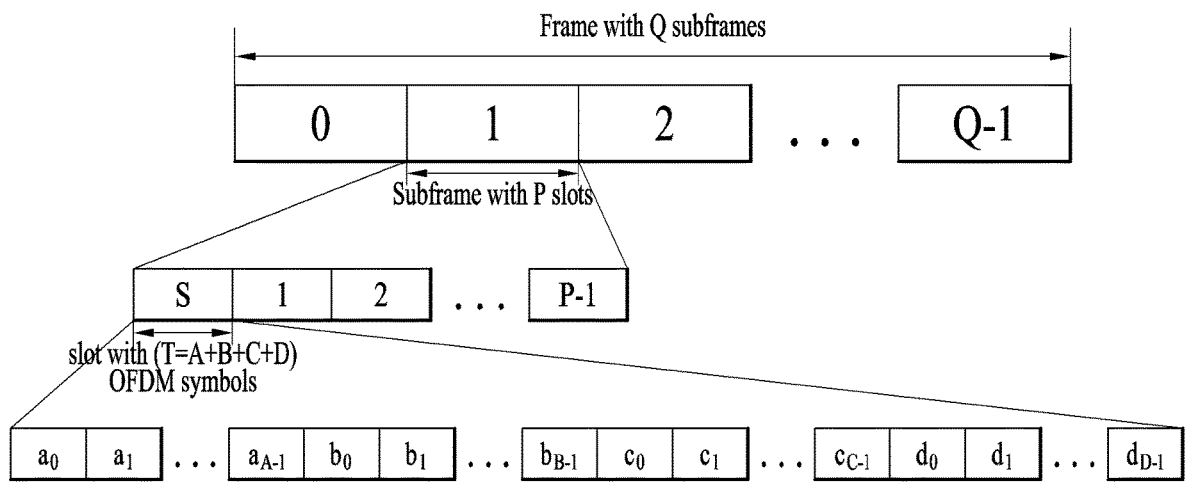
FIG. 5 shows an example of a frame structure proposed in a communication environment that uses mm Wave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\operatorname{argmax}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|}$$ [Equation 3]

where $$y_{\tilde{n},i} \triangleq r[\tilde{n}+i(N+N_g):\tilde{n}+i(N+N_g)+N-1]$$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))_{th}$ element to $(\tilde{n}+i(N+N_g)+N-1)_{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\operatorname{argmax}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2}$$ [Equation 4]

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning procedure is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning procedure can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning procedure, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi r n(n+1)}{N}}$$ [Equation 5]

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i=j \\ 0 & \text{elsewhere} \end{cases}$$ [Equation 6]

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \dfrac{1}{\sqrt{N}} & \text{elsewhere} \end{cases}$$ [Equation 7]

In equation 7, $r_1$ or $r_2$ is a coprime of N. For example, if N=111, $2 \le r_1, r_2 \le 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}}$$ [Equation 8]

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$ [Equation 9]

From Equation 9, it can be observed that columns and rows are orthogonal to each other.

Figure 6:
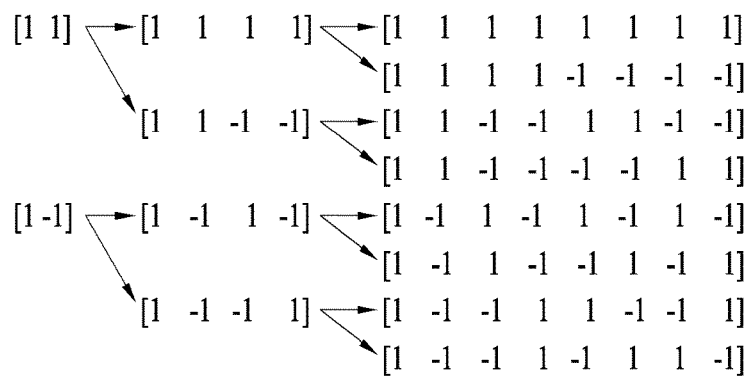
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
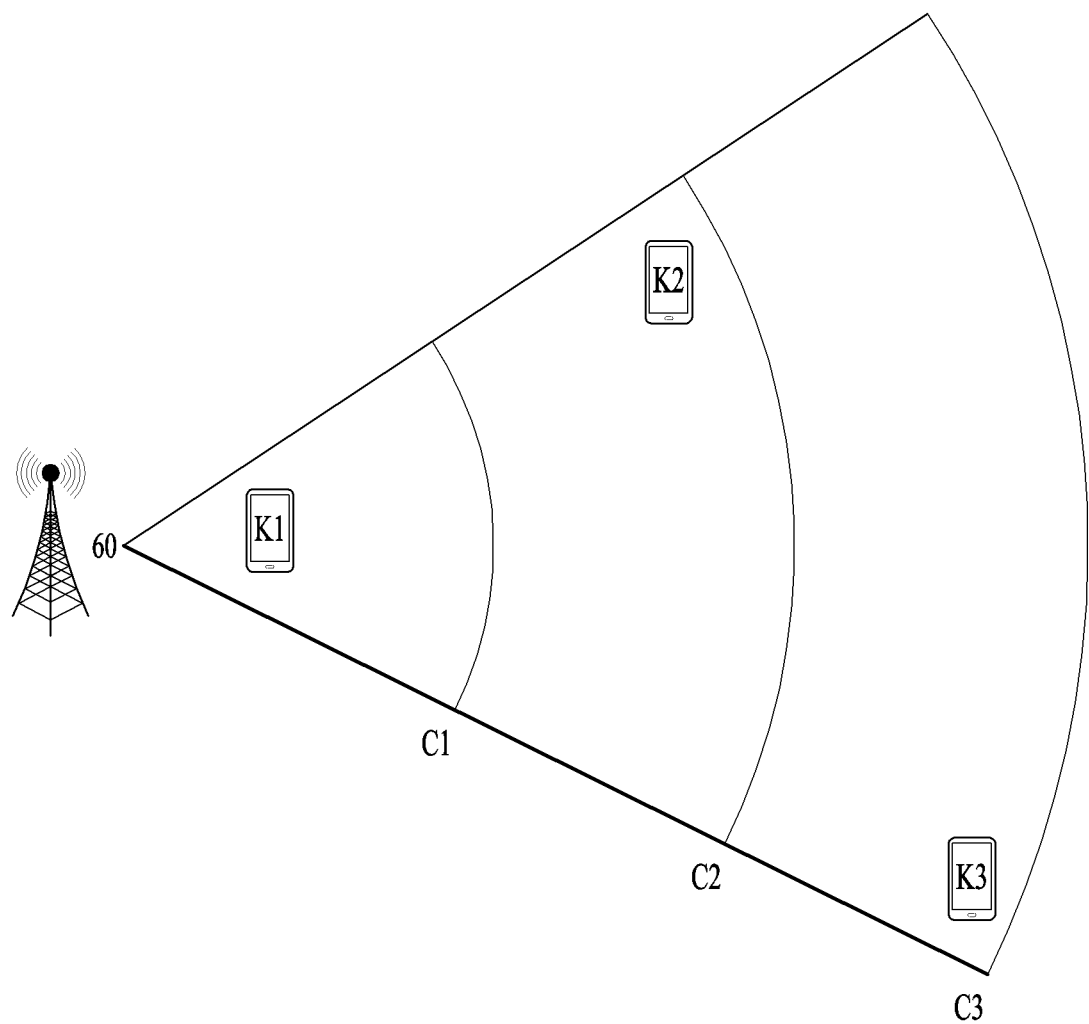
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$$P\_PRACH\_Initial = \min\{P\_CMAX, preambleInitialReceivedTargetPower + PL\}$$ [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitial-ReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

2. First Proposed Method for Transmitting and Receiving Synchronization Signal

Figure 8:
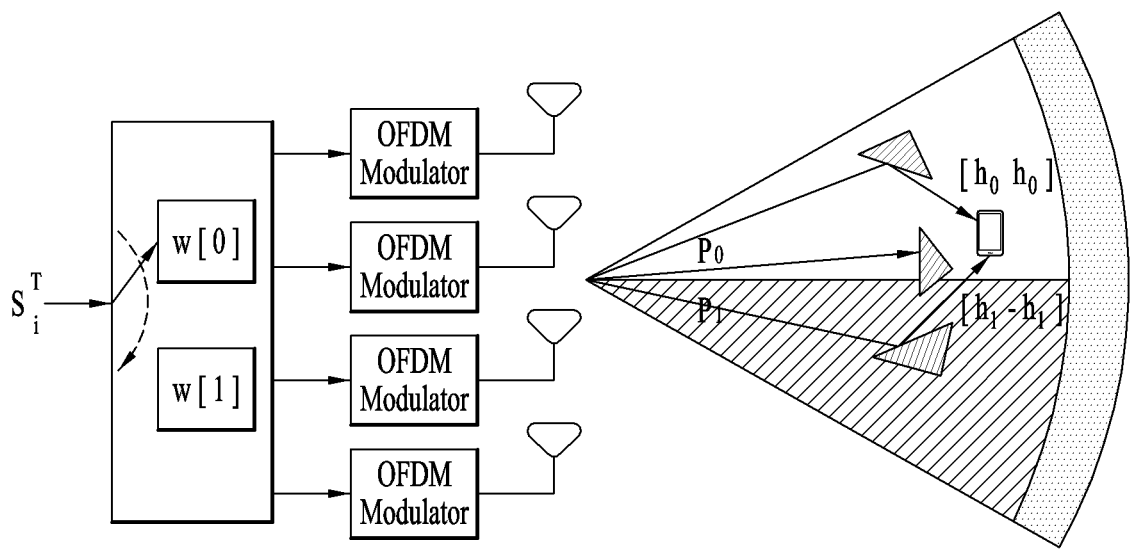
FIG. 8 is a diagram illustrating a synchronization signal transmission structure according to one embodiment.

FIG. 8 is a diagram illustrating a synchronization signal transmission structure according to a proposed embodiment. According to the proposed embodiment, a base station defines a new precoder consisting of weighted sums of two or more basic precoders applied to a repeatedly transmitted synchronization signal. And, the base station defines a plurality of new precoders, which are generated by changing the weighted sums, as a codebook.

FIG. 8 illustrates a case that the number of repeatedly transmitting a synchronization signal corresponds to 2. FIG. 8 illustrates a structure of repeatedly transmitting a synchronization signal for obtaining diversity.

First of all, the number of antennas of a base station transmitting a synchronization signal, a length of an OFDM symbol, and a length of a CP are defined as $N_T$, $N_S$ and $N_{CP}$, respectively. Basic precoders are defined as $p_0$, $p_1$, respectively. A new precoder configured by a weighted sum is defined as w[0], w[1]. In the basic precoder and the new precoder, '0' and '1' correspond to an order of transmitting a synchronization signal, i.e., an OFDM symbol. The basic precoder and the new precoder correspond to a vector matrix and a size of the vector matrix is identical to the number of antenna ports of the base station. In particular, in FIG. 8, a size of the $p_0$, $p_1$ and a size of the w[0], w[1] correspond to 4×1 vector.

Meanwhile, in the embodiment of FIG. 8, a codebook defined by the base station is represented by {w[0], w[1]} and the codebook can be comprehended as equation 11 described in the following.

$$w[0] = \frac{1}{\sqrt{2}}(p_0 + p_1), w[1] = \frac{1}{\sqrt{2}}(p_0 - p_1) \quad \text{[Equation 11]}$$

$$\text{where } p_j \in C^{N_T \times 1}, \|p_j\|^2 = 1, \forall j$$

In Equation 11, a precoder w[0] is configured by the sum of $p_0$, $p_1$ corresponding to basic precoders and a precoder w[1] is configured by a difference between the $p_0$, $p_1$. In particular, a new precoder w[0], w[1] is defined by a weighted sum of the two basic precoders and a weight of the weighted sum is different from each other. For example, in case of a cell structure shown in the right side of FIG. 8, a precoder corresponding to a subsector positioned at the top and a precoder corresponding to a subsector positioned at the bottom are defined as $p_0$ and $p_1$, respectively. In this case, a base station transmits a synchronization signal to a UE by applying a new precoder w[0] defined by a weighted sum [+1 −1] to the synchronization signal in a first OFDM symbol and transmits a synchronization signal to the UE by applying a new precoder w[1] defined by a different weighted sum [+1 −1] to the synchronization signal in a second OFDM symbol. In particular, although the UE is positioned at a subsector boundary, the UE is able to obtain diversity for the two precoders. Hence, the UE is able to precisely distinguish synchronization signals different from each other.

In the foregoing description, it is assumed that a repetition count corresponds to 2. Meanwhile, if the number of repeatedly transmitting a synchronization signal transmitted by the base station corresponds to $N_R$, a precoder codebook of the synchronization signal can be defined as equation 12 in the following in a manner of being generalized.

$$W_{N_R} = \frac{1}{\sqrt{N_R}} Q_{N_R} P_{N_R} \quad \text{[Equation 12]}$$

$$\text{where } W_{N_R} = [w^T[0] w^T[1] \ldots w^T[N_R - 1]]^T$$

$$P_{N_R}^T = [p_0^T \; p_1^T \; \ldots \; p_{N_R-1}^T], Q_{N_R} \triangleq H_{N_R} \otimes I_{N_T}$$

In equation 12, a vector w[t] corresponds to a precoder applied to a synchronization signal which is repeatedly transmitted at $t^{th}$ time. A synchronization codebook is defined by {w[0], w[1], . . . w[$N_R$−1]} and a matrix $H_{N_R}$ indicating a channel corresponds to a random matrix of a size of $N_R$.

In particular, when a base station repeatedly transmits a synchronization signal, a codebook is configured by weighted sums of basic precoders. The base station selects a precoder from the codebook including a plurality of new precoders different from each other and applies the selected precoder to the synchronization signal whenever the synchronization is repeated. The number of new precoders included in the codebook may be identical to the number of repeatedly transmitting the synchronization signal.

Figure 9:
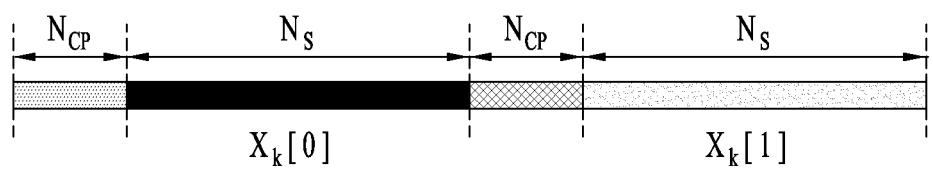
FIG. 9 illustrates a repeatedly transmitted synchronization signal according to one embodiment.

FIG. 9 illustrates a repeatedly transmitted synchronization signal according to a proposed embodiment.

Meanwhile, according to a different proposed embodiment, when a base station repeatedly transmits a synchronization signal, the base station may transmit the synchronization signal by selecting a precoder which is not selected from a codebook whenever the synchronization is repeatedly transmitted. In particular, in order to maximize transmission diversity of the synchronization signal, the base station selects a precoder which is not selected from among the $N_R$ number of precoders included in a codebook {w[0], w[1], . . . , w[$N_R$−1]} whenever the synchronization signal is repeated.

For example, in case of the equation 11 of which the repetition count corresponds to 2, when the base station transmits a synchronization signal in a first OFDM symbol, the base station selects a precoder w[0] from a codebook {w[0], w[1]}. When the transmits a synchronization signal in a second OFDM symbol, the base station selects a precoder w[1]. This procedure is shown in the left side of FIG. 8 as a structure of changing a switch of an RF module. In this case, as shown in equation 13 in the following, a synchronization signal, which is transmitted via a $k^{th}$ antenna among the $N_T$ number of transmission antennas, is generated using an $i^{th}$ sequence $s_i$ and precoders w[0], w[1].

$$x_k[0] = F^H w_k[0] s_i$$

$$x_k[1] = F^H w_k[1] s_i \quad \text{[Equation 13]}$$

$$\text{where } x_k[t] \in C^{N_S \times 1}, k=0, \ldots, N_T-1$$

$$s_i \in C^{N_S \times 1}$$

In equation 13, $F^H$ corresponds to an IDFT (Inverse Discrete Fourier Transform) matrix and $w_k[t]$ corresponds to a $k^{th}$ element of a precoder w[t]. FIG. 9 shows a procedure that a synchronization signal is repeatedly transmitted two times in the $k^{th}$ antenna mentioned earlier in the equation 13.

Figure 10:
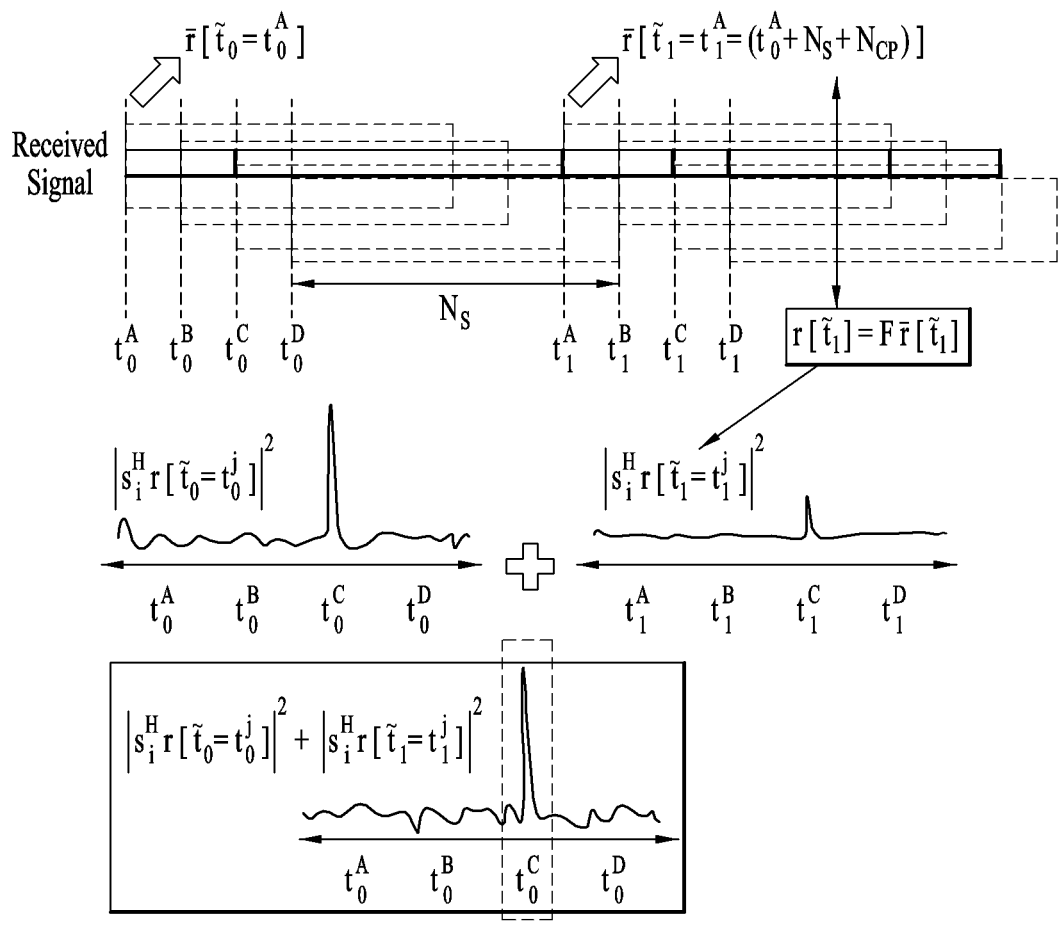
FIG. 10 illustrates a process for a UE, which has received a synchronization signal, to estimate a sequence and timing.

FIG. 10 illustrates a process for a UE, which has received a synchronization signal, to estimate a sequence and timing. In FIG. 10, an operation of a UE is explained when a base station repeatedly transmits a synchronization signal according to the aforementioned embodiments.

First of all, an algorithm for a UE to synchronize timing from a synchronization signal received from a base station and estimate a sequence can be represented as equation 14 described in the following.

$$\{\hat{t}_0, \hat{i}\} = \underset{\hat{t}_0, \hat{i}}{\operatorname{argmax}} [|s_i^H r[\hat{t}_0]|^2 + |s_i^H r[\hat{t}_1]|^2] \quad \text{[Equation 14]}$$

In equation 14, $\{\hat{t}_0, \hat{i}\}$ corresponds to trial numbers for estimating timing and a sequence, respectively. $\{\hat{t}_0, \hat{i}\}$ corresponds to a trial number when a result value of the equation 14 becomes a maximum value. In particular, the $\{\hat{t}_0, \hat{i}\}$ corresponds to an index of the timing and the sequence estimated from a synchronization signal received by a UE.

Meanwhile, the equation 14 can be schematically represented as FIG. 10. In FIG. 10, 4 timings $\{t_0^A, t_0^B, t_0^C, t_0^D\}$ different from each other are depicted. A correlation size between a reception signal and a sequence at each timing is shown in FIG. 10. In FIG. 10, $\bar{r}[\hat{t}_o = t_0^A]$ corresponds to a reception signal vector received at the timing $t_0^A$ and a length of the reception signal vector corresponds to $N_S$. $r[\tilde{t}_o=t_0^A]$ corresponds to a signal after DFT processing is performed on $\bar{r}[\tilde{t}_o=t_0^A]$.

Referring to FIG. 10, the UE calculates the equation 14 by applying timing $\tilde{t}_o$ and a sequence index $\tilde{i}$ as trial numbers. In the example of FIG. 10, when the UE calculates the equation 14, since a correlation value calculated at the timing $t_0^C$ is the biggest, the UE determines the $t_0^C$ as timing of a synchronization signal and determines that an $i^{th}$ sequence has been transmitted.

Meanwhile, if a channel is not changed and noise does not occur while a synchronization signal is repeatedly received two times, a size of a peak value calculated via the equation 14 can be represented as equation 15 described in the following.

$$|s_{\tilde{i}=i}^H r[\tilde{t}_o=t_0^C]|^2+|s_{\tilde{i}=i}^H r[\tilde{t}_1=t_1^C]|^2=P(|h_0|^2+|h_1|^2) \qquad \text{[Equation 15]}$$

In equation 15, $h_i=p_i^T g$ is satisfied and g corresponds to a channel between a transmitter and a receiver. Reception SNR of a UE can be calculated as equation 16 described in the following based on the equation 15.

$$SNR_{Repetition}=\frac{2P|h_0|^2}{\sigma_w^2}\rightarrow SNR_{Proposed}=\frac{P(|h_0|^2+|h_1|^2)}{\sigma_w^2} \qquad \text{[Equation 16]}$$

In equation 16, $SNR_{Repetition}$ indicates reception SNR when a synchronization signal is transmitted by simply repeating the synchronization signal and $SNR_{proposed}$ indicates reception SNR when a synchronization signal is transmitted by configuring a precoder for obtaining diversity according to a proposed embodiment. In the former case, reception power of the synchronization signal is doubled. On the contrary, in the latter case, reception power is represented by two channels including $|h_0|^2$ and $|h_1|^2$. If the $|h_0|^2$ and $|h_1|^2$ are independent from each other, a diversity gain of the $SNR_{proposed}$ is doubled. In the meantime, since the reception power of the $SNR_{Repetition}$ is represented by a single channel only, a diversity gain of the $SNR_{Repetition}$ becomes 1.

Meanwhile, since it is necessary for all UEs belonging to a cell to detect a synchronization signal, the most important element of the synchronization signal is stability of a communication link. As a diversity gain has a higher value, the stability of the communication link can be increased. Hence, if it follows the proposed embodiment, it may be able to obtain an enhanced effect compared to a legacy synchronization signal transmission method.

Figure 11:
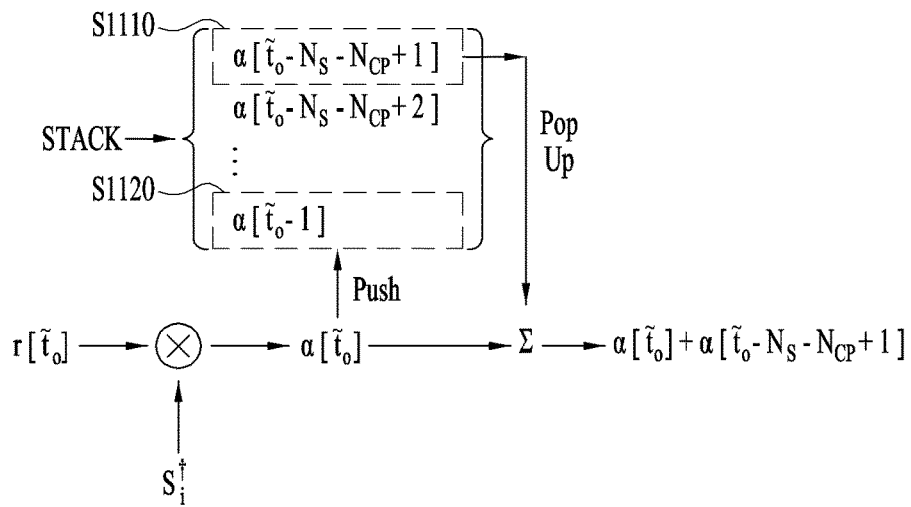
FIG. 11 illustrates a different embodiment of a process for a UE to synchronize timing using a synchronization signal.

FIG. 11 illustrates a different embodiment of a process for a UE to synchronize timing using a synchronization signal.

According to what is mentioned earlier in FIG. 10 and equation 15, a peak value at the timing of $t_0=t_0^A$ is calculated as $|s_i^\dagger r[\tilde{t}_o=t_0^A]|^2+|s_i^\dagger r[\tilde{t}_1=t_1^A]|^2$. Meanwhile, a peak value at the timing of $t_0=t_1^A=(t_0^A+N_S+N_{CP})$ is calculated as $|s_i^\dagger r[\tilde{t}_o=t_1^A]|^2+|s_i^\dagger r[\tilde{t}_1=t_1^A+N_S+N_{CP}]|^2$. In this case, it is able to see that a term $|s_i^\dagger r[\tilde{t}_1=t_1^A]|^2$ is common to the two peak values.

In particular, according to the proposed embodiment, while a value $|s_i^\dagger r[\tilde{t}_1=t_1^A]|^2$, which is obtained by a UE in the course of calculating the peak value at the timing of $t_0^A$, is stored in a stack, the UE may utilize a value stored in the course of calculating the peak value at the timing of $t_0=t_1^A=(t_0^A+N_S+N_{CP})$. Consequently, the UE can reduce calculation complexity by avoiding overlapped calculation by utilizing a memory.

The abovementioned content is shown in FIG. 11. In FIG. 11, $\alpha[\tilde{t}_0]$ is defined as $\alpha[\tilde{t}_0]\triangleq|s_i^\dagger r[\tilde{t}_0]|^2$. A step [S1120] of storing a value currently obtained in the course of calculating a peak value is defined as a 'push' operation and a step [S1110] of retrieving a value stored in a stack in advance and using the value is defined as a 'pop up' operation. In FIG. 11, since the 'push' operation and the 'pop up' operation make a pair, the total size of the stack is always maintained by $(N_S+N_{CP})$.

Meanwhile, as mentioned in the foregoing description, an embodiment of using a stack can be extended to a random repetition count $N_R$. In this case, the stack is defined as equation 17 described in the following and a size of the stack becomes $(N_R-1)(N_S+N_{CP})$. In particular, a UE stores values calculated during a time period as much as the sum of a length of an OFDM symbol and a CP length in the stack. If the time period as much as the sum of the length of the OFDM symbol and the CP length elapses, the UE retrieves the values stored in the stack and utilizes the values for new calculation.

$$\begin{cases} \alpha[\tilde{t}_o-(N_R-1)(N_S+N_{CP})+1] \\ \alpha[\tilde{t}_o-(N_R-1)(N_S+N_{CP})+2] \\ \vdots \\ \alpha[\tilde{t}_o-1] \end{cases} \qquad \text{[Equation 17]}$$

Figure 12:
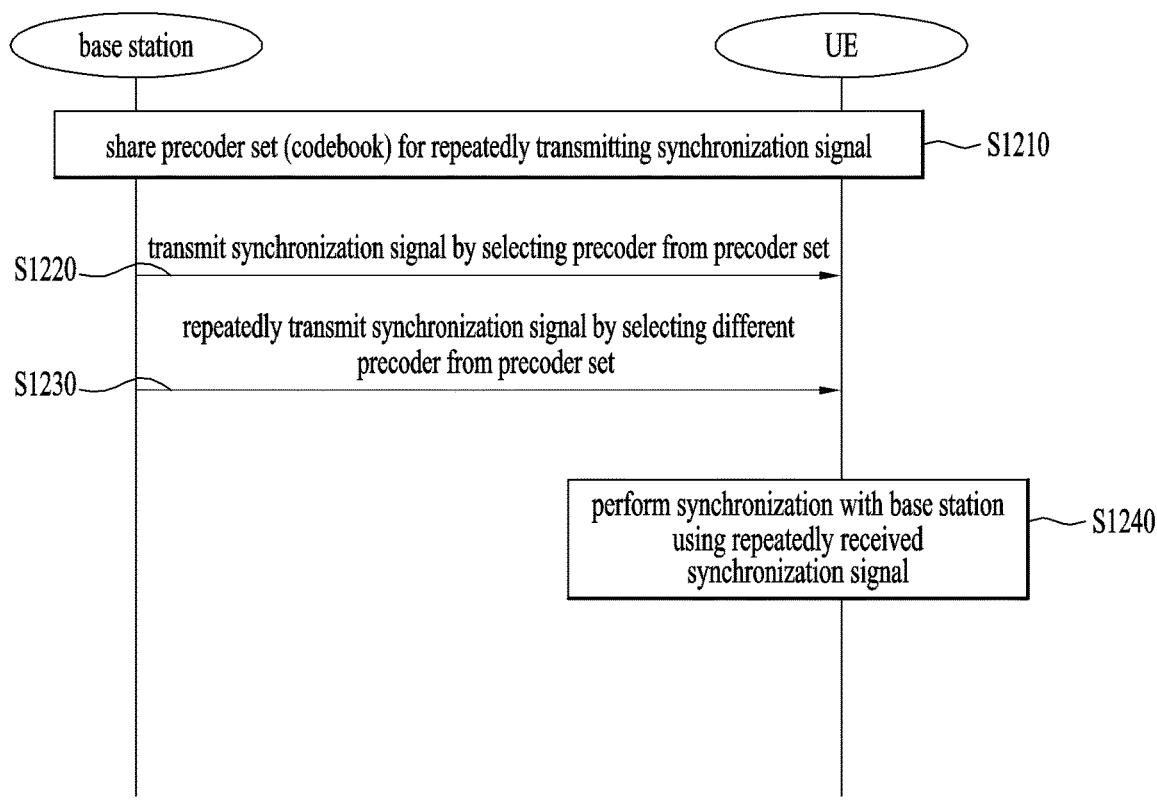
FIG. 12 is a flowchart for a method of transmitting and receiving a synchronization signal according to one embodiment.

FIG. 12 is a flowchart for a method of transmitting and receiving a synchronization signal according to one embodiment. In FIG. 12, the aforementioned embodiments are depicted and explained according to a flow of time. In particular, although it is not explicitly described in FIG. 12, the aforementioned contents can be identically or similarly applied.

First of all, a base station and a UE share a precoder set (i.e., a codebook) for repeatedly transmitting a synchronization signal [S1210]. The codebook includes a plurality of new precoders configured by weighted sums of basic precoders. A weighted sum is differently applied to each of a plurality of the new precoders. Meanwhile, the codebook generated by the base station can be transmitted to the UE. Or, the UE may directly generate the codebook.

Subsequently, the base station transmits a synchronization signal by selecting one from among the precoders constructing the precoder set (codebook) [S1220]. A precoder can be randomly selected from among the precoders included in the precoder set as a precoder applied to the synchronization signal. Subsequently, the base station selects a different precoder from the precoder set (codebook) in a next OFDM symbol and repeatedly transmits the synchronization signal [S1230]. In the step S1230, a precoder rather than the precoder selected in the step S1220 is selected from the precoder set. In FIG. 12, it is assumed a case that the number of repeatedly transmitting the synchronization signal corresponds to 2. If the repetition count is higher, the step S1230 can be repeatedly performed.

The UE performs synchronization with the base station using the repeatedly received synchronization signal [S1240]. This step can be comprehended as a step of estimating a best value by calculating a correlation between timing of the received synchronization signal and a sequence. When the UE calculates the correlation, it may apply an embodiment of storing median values in a stack and retrieving the values.

According to the aforementioned embodiments, since it is able to obtain transmission diversity in the course of repeatedly transmitting a synchronization signal, it is able to secure stability of a communication link. As a result, it is able to stably forward the synchronization signal to a UE in communication environment where a pathloss considerably occurs such as mm Wave communication system.

3. Second Proposed Method for Transmitting and Receiving Synchronization Signal

Figure 13:
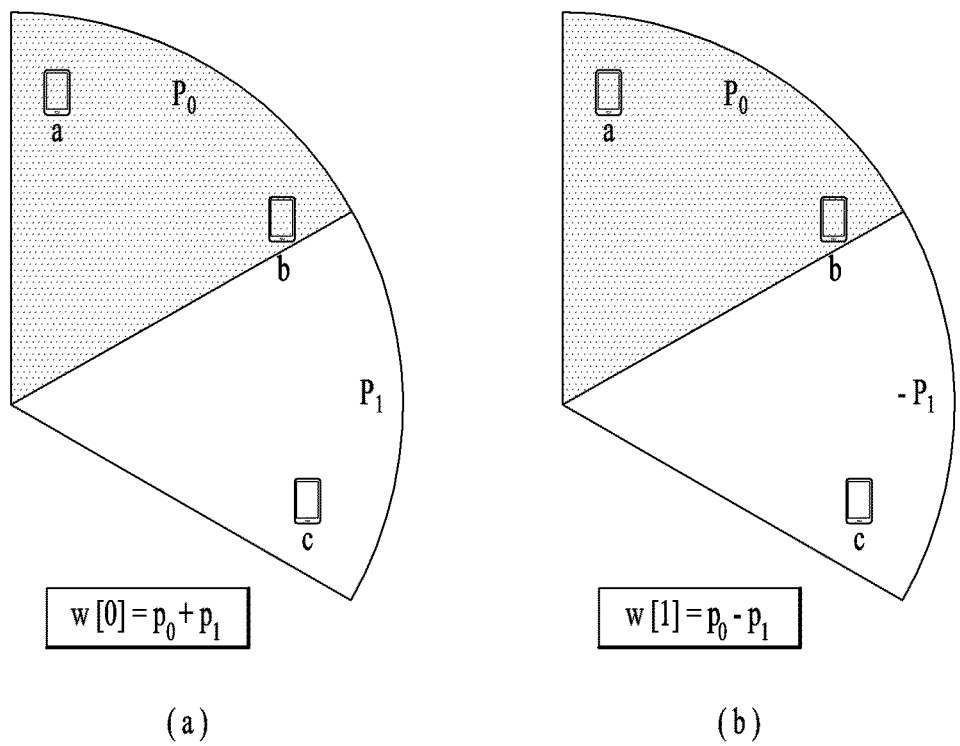
FIG. 13 is a diagram for proposing a further different embodiment related to a method of transmitting and receiving a synchronization signal.

FIG. 13 shows a synchronization signal transmission structure according to FIGS. 8 to 12. The reception SNR mentioned earlier in the equation 16 can be represented as equation 18 described in the following in consideration of a pathloss.

$$SNR_{Proposed} = \frac{P(\beta_0|h_0|^2 + \beta_1|h_1|^2)}{\sigma_w^2} \quad \text{[Equation 18]}$$

In equation 18, $\beta_0$ and $\beta_1$ correspond to a pathloss when beams transmitted by precoders $p_0$, $p_1$ arrive at a UE.

Meanwhile, in FIG. 13, since a UE b is located at a boundary of two subsectors, the UE b receives both of the beams transmitted by the $p_0$, $p_1$. Hence, $\beta_0 \approx \beta_1$ is satisfied. In this environment, reception SNR for the UE b can be approximated as shown in equation 19 described in the following.

$$SNR_{Proposed} \approx \frac{P\beta_0(|h_0|^2 + |h_1|^2)}{\sigma_w^2} \quad \text{[Equation 19]}$$

The equation 19 means that a diversity gain for the UE b can be obtained by 2.

Meanwhile, since a UE a is located at a position far from $p_1$, $\beta_0 \gg \beta_1$ is satisfied. In this environment, reception SNR of the UE a can be approximated as shown in equation 20 described in the following.

$$SNR_{Proposed} \approx \frac{P\beta_0|h_0|^2}{\sigma_w^2} \quad \text{[Equation 20]}$$

The equation 20 means that a diversity gain obtained by the UE a corresponds to 1 rather than 2. On the contrary, a UE c is located at a position far from $p_0$. Similar to the UE a, the UE c can only obtain a diversity gain as much as 1. In other word, according to the aforementioned embodiments mentioned earlier in FIGS. 8 to 12, although the UE b is able to obtain sufficient diversity gains, the UEs a and c are unable to obtain sufficient diversity gains.

A UE should receive a synchronization signal with quality equal to or greater than a certain level irrespective of a position of the UE in a cell. Hence, in the following, an embodiment for enhancing a point that UEs obtain a different diversity gain according to a position in a cell is proposed.

In the contents mentioned earlier in FIGS. 8 to 12, a scheme of designing a 'basic precoder $p_i$' is proposed. In the following description, a 'second precoder' corresponds to the aforementioned basic precoder $p_i$. According to the proposed embodiment, the second precoder is configured by a weighted sum of two or more 'first precoders ($q_j$). In relation to the contents mentioned earlier in FIGS. 8 to 12, the second precoder ($p_i$) is defined by weighted sums of a plurality of first precoders ($q_j$) and a new precoder w[t] (hereinafter, third precoder) is defined by weighted sums of a plurality of second precoders.

When a $j^{th}$ first precoder and an $i^{th}$ second precoder are represented as $q_j$ and $p_i$, respectively, a relation between the two precoders is represented according to equation 21 described in the following.

$$p_i = \sum_{n=0}^{Q_i-1} w_{in} q_{f_i(n)}, \; w_{in} \in C \quad \text{[Equation 21]}$$

In equation 21, $w_{in}$ corresponds to a complex number and indicates a weight for first precoders that construct an $i^{th}$ second precoder. In particular, the $w_{in}$ indicates a form of weighted sums of the first precoders. $Q_i$ corresponds to the number of first precoders constructing an $i^{th}$ second precoder. $f_i(n)$ corresponds to indexes of the first precoders that construct the $i^{th}$ second precoder.

An equation 22 described in the following shows an example that second precoders are configured by a weighted sum of two first precoders.

$$p_0 = q_0 + q_2$$

$$p_1 = q_1 + q_3 \quad \text{[Equation 22]}$$

In equation 22, $Q_0 = Q_1 = 2$, $\{f_0(0) = 0, f_0(1) = 2, f_1(0) = 1, f_1(1) = 3\}$, and $w_{00} = w_{01} = w_{10} = w_{11} = 1$ are satisfied. Since corresponds to a complex number, a second precoder can be implemented in a form that a specific first precoder is multiplied by j or ~j that changes a phase.

Figure 14:
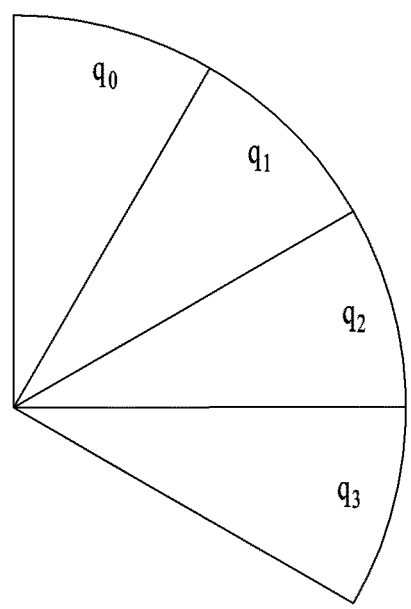

FIG. 14 illustrates an example of designing first precoders that configure a second precoder.

According to one embodiment, it may be able to design first precoders to divide a region to which a synchronization signal is transmitted with a size as equal as possible. In an embodiment shown in FIG. 14, the first precoders are designed to divide a region 120' to which a synchronization signal is transmitted with the same size in a manner that each beam is formed by 30'.

In this case, the first precoders can be designed to make a minimum Chordal distance between the first precoders to be the maximum. The minimum Chordal distance corresponds to an interval between beams formed by a precoder. If the minimum Chordal distance becomes the maximum, it means that the interval between beams formed by precoders becomes the maximum, i.e., a correlation between beams becomes the minimum. For example, it may be able to design a first precoder to make the minimum Chordal distance to be the maximum using a DFT codebook.

Figure 16:
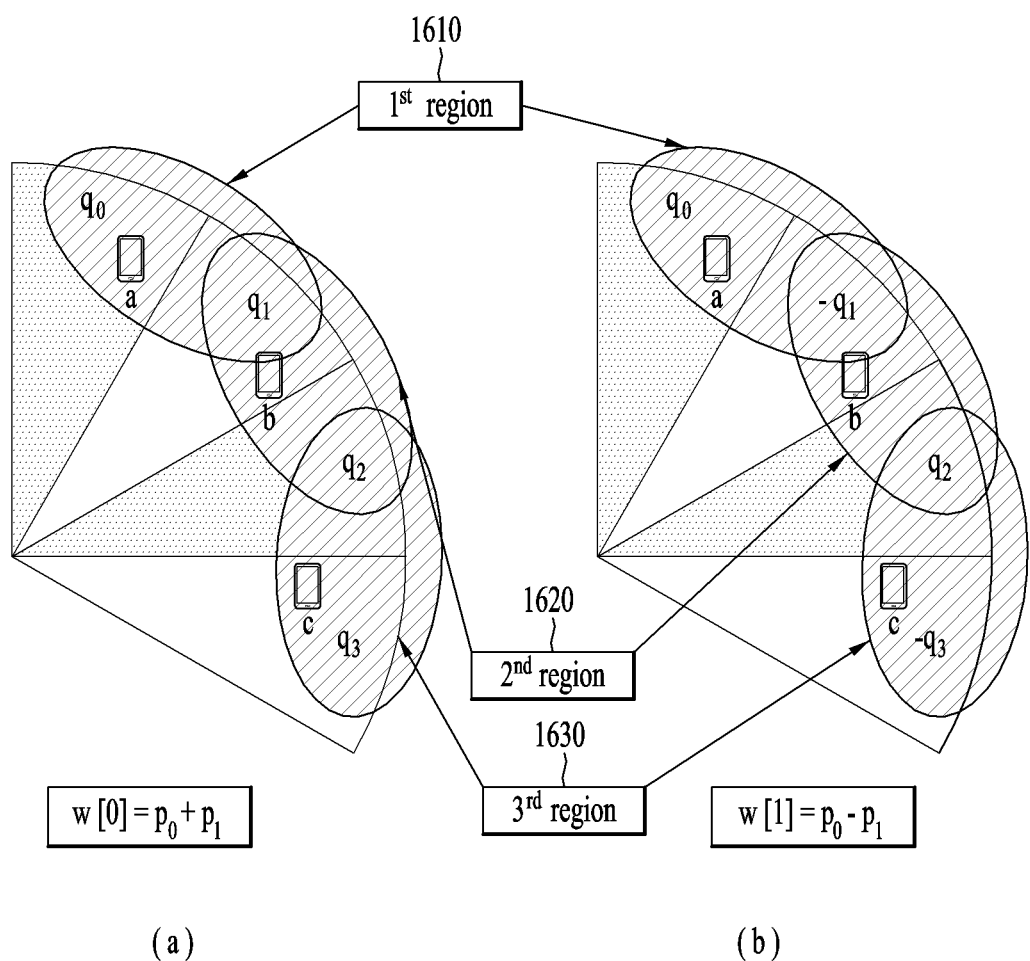

FIGS. 15 to 17 are diagrams illustrating a synchronization signal transmission structure according to a further different embodiment. In the following, in addition to the aforementioned contents, embodiments of designing a second precoder using a first precoder are explained.

According to one embodiment, a second precoder is configured by weighted sums of first precoders and can be designed with a comb structure. As shown in FIG. 14, the comb structure means that regions are not adjacent to each other within a subsector of first precoders that construct a second precoder and a minimum distance between the regions is the same within the subsector of the first precoders.

For example, referring to FIG. 15(a), regions of first precoders $q_0$ and $q_2$ constructing a second precoder $p_0$ are not adjacent to each other. And, referring to FIG. 15(*b*), regions of first precoders $q_1$ and $q_3$ constructing a second precoder $p_1$ are not adjacent to each other. Moreover, a minimum distance between regions within a subsector of the first precoders $q_0$ and $q_2$ constructing the second precoder $p_0$ corresponds to 30' and a minimum distance between regions within a subsector of the first precoders $q_1$ and $q_3$ constructing the second precoder $p_1$ corresponds to 30' as well. A beam region of the second precoder $p_1$ can be comprehended as a form that a beam region of the second precoder $p_0$ is shifted as much as 30'.

Meanwhile, when a second precoder is configured using a first precoder according to the aforementioned embodiments, third precoders shown in the equation 11 can be represented as equation 23 described in the following.

$$w[0] = \frac{1}{\sqrt{2}}(p_0 + p_1) = \frac{1}{\sqrt{2}}(q_0 + q_1 + q_2 + q_3)$$
$$w[1] = \frac{1}{\sqrt{2}}(p_0 - p_1) = \frac{1}{\sqrt{2}}(q_0 - q_1 + q_2 - q_3)$$

[Equation 23]

In equation 23, in case of signs of $q_1$, $q_3$, it is able to see that a phase of a synchronization signal has reversed for a partial region within a subsector in a second time period.

FIG. 16 illustrates a case of designing a second precoder according to a proposed embodiment. As mentioned earlier in the equation 23, a phase of $q_1$, $q_3$ reverses for a time period of two times. Meanwhile, a phase change of a beam is explained according to a time period for each of regions 1610, 1620, and 1630. A phase of a beam is changed to $\{q_0, q_1\} \rightarrow \{q_0, -q_1\}$ over a first time period and a second time period for the region 1610. A phase of a beam is changed to $\{q_1, q_2\} \rightarrow \{-q_1, q_2\}$ over a time period of total two times for the region 1620 and a phase of a beam is changed to $\{q_2, q_3\} \rightarrow \{q_2, -q_3\}$ for the region 1630.

Unlike the case mentioned earlier in FIG. 13, a UE a experiences a phase change of an adjacent beam $q_1$ over a time period of two times. Hence, the UE a can obtain a diversity gain as much as 2 for a synchronization signal. Similarly, a UE b experiences a phase change of a beam $q_1$ and a UE c experiences a phase change of a beam $q_3$. As a result, all UEs belonging to a subsector can obtain the same diversity gain.

FIG. 17 illustrates an embodiment that a region in a subsector corresponding to first precoders is designed to be more narrower. In FIGS. 14 to 16, 4 first precoders are assumed. On the contrary, in FIG. 17, a second precoder is designed through 8 first precoders. According to the embodiment proposed in FIG. 17, UEs receiving a synchronization signal can receive a more uniform diversity gain compared to the embodiments proposed in FIGS. 14 to 16.

Figure 18:
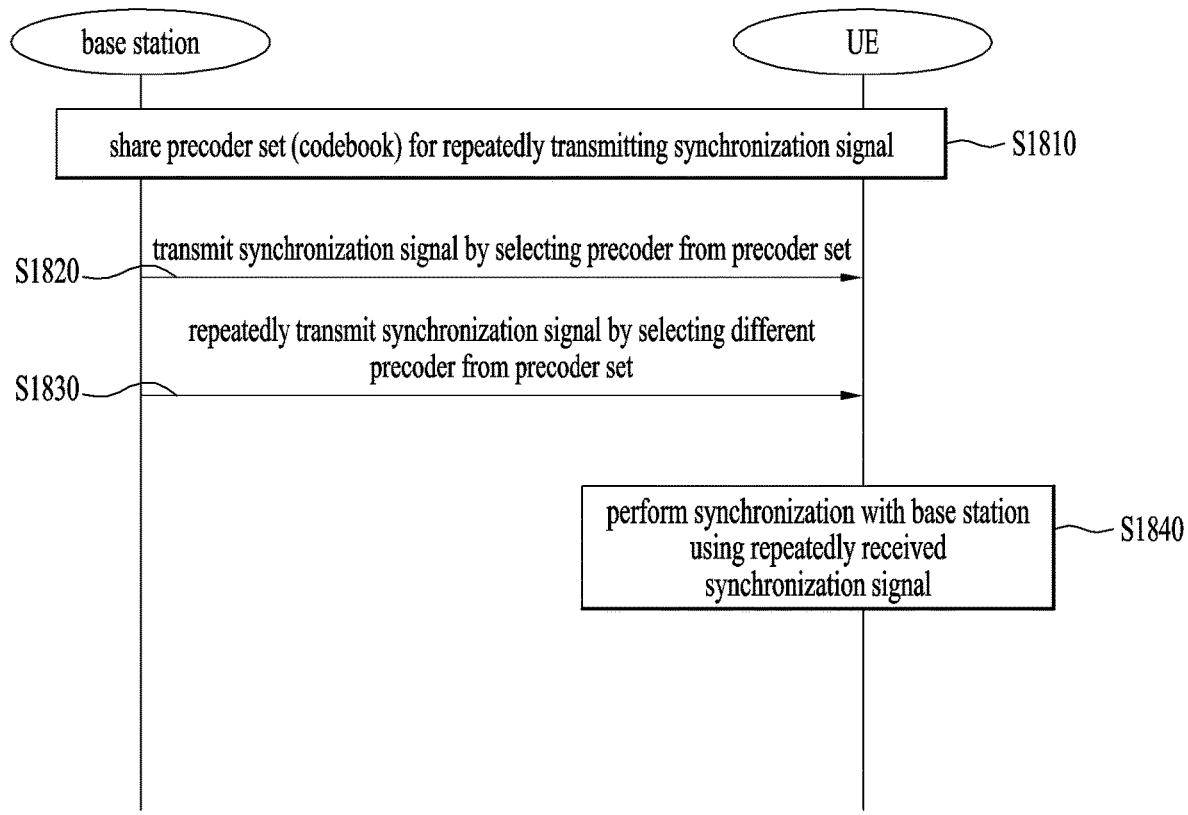
FIG. 18 is a flowchart for a method of transmitting and receiving a synchronization signal according to FIGS. 14 to 17.

FIG. 18 is a flowchart for a method of transmitting and receiving a synchronization signal according to a further different embodiment. In FIG. 18, the aforementioned embodiments are depicted and explained according to a time flow. In particular, although it is not explicitly described in FIG. 18, the aforementioned contents can be identically or similarly applied.

First of all, a base station and a UE share a precoder set (i.e., a codebook) for repeatedly transmitting a synchronization signal [S1810]. The codebook can include third precoders configured by weighted sums of second precoders. A weighted sum is differently applied to each of the second precoders. Meanwhile, the second precoders can also be configured by weighted sums of first precoders. Regions are not adjacent to each other within a subsector of the first precoders that construct each of the second precoders. A minimum distance between the regions within the subsector of the first precoders can be designed using the same comb structure. Meanwhile, as mentioned earlier in FIG. 12, the codebook can be transmitted to the UE in a manner of being generated by the base station. Or, the UE may directly generate the codebook.

Subsequently, the base station transmits a synchronization signal by selecting one from among third precoders constructing the precoder set (codebook) [S1820]. A precoder can be randomly selected from among the third precoders included in the precoder set as a third precoder applied to the synchronization signal. Subsequently, the base station selects a different third precoder from the precoder set (codebook) in a next OFDM symbol and repeatedly transmits the synchronization signal [S1830]. In the step S1830, a third precoder rather than the precoder selected in the step S1820 is selected from the precoder set. In FIG. 18, it is assumed a case that the number of repeatedly transmitting the synchronization signal corresponds to 2. If the repetition count is higher, the step S1830 can be repeatedly performed.

The UE performs synchronization with the base station using the repeatedly received synchronization signal [S1840]. This step can be comprehended as a step of estimating a best value by calculating a correlation between timing of the synchronization signal received by the UE and a sequence. When the UE calculates the correlation, the step S1840 may apply an embodiment of storing median values in a stack and retrieving the values according to the embodiments mentioned earlier in FIGS. 10 and 11.

According to the aforementioned embodiments, since it is able to obtain transmission diversity in the course of repeatedly transmitting a synchronization signal, it is able to secure stability of a communication link. And, it is able to transmit the synchronization signal to UEs belonging to a cell using a constant diversity gain without additional signaling overhead.

Figure 19:
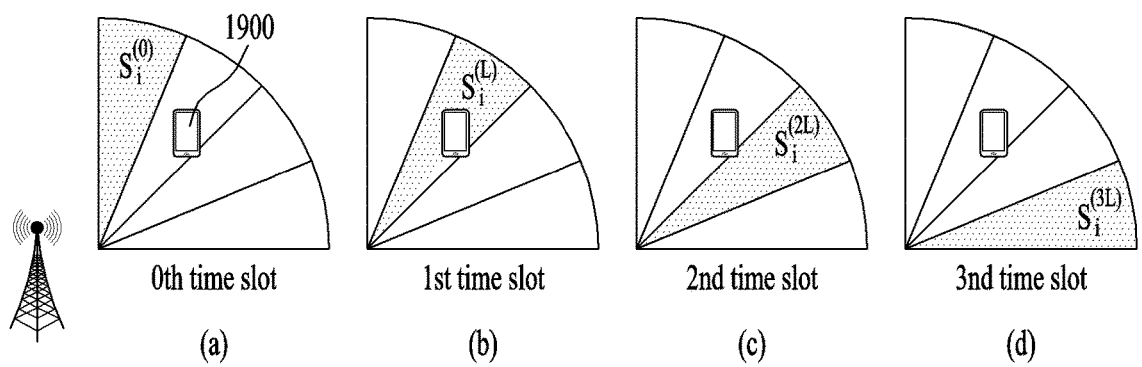
FIGS. 19 and 20 illustrate a synchronization signal and a beam scanning signal transmission structure for explaining a further different embodiment.
Figure 20:
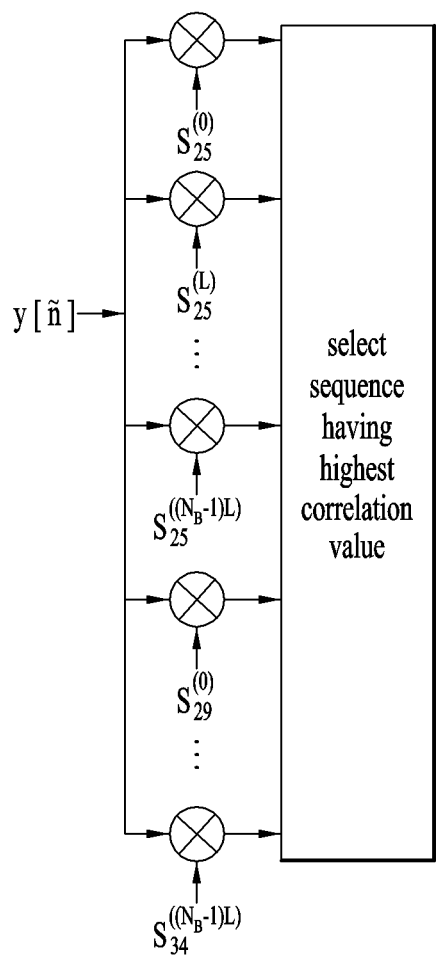

4. Synchronization Procedure and Beam Scanning Procedure Proposed in the Present Invention FIGS. 19 and 20 illustrate a synchronization signal and a beam scanning signal transmission structure for explaining a further different embodiment. In FIGS. 19 and 20, a synchronization procedure and a beam scanning procedure are explained according to the aforementioned synchronization signal transmission/reception scheme.

FIG. 19 illustrates a procedure for a base station to transmit a synchronization signal by switching 4 beams during 4 time slots. A UE performs a synchronization procedure using received synchronization signals and performs a beam scanning procedure at the same time. For example, a UE 1900 performs synchronization via a second beam (FIG. 19(*b*)) of which strongest reception power is detected. In order to distinguish a beam selected by the UE from other beams, the base station maps each of the beams using a different sequence. Consequently, the UE 1900 is able to know that a sequence of the beam selected by the UE corresponds to $s_i^{(L)}$. The UE feedbacks the selected beam to the base station to perform the beam scanning procedure.

In the aforementioned procedure, a signal transmitted by the base station is designed based on a ZC (Zadoff-Chu) sequence. A cell ID of the base station is used as a root value of the ZC sequence and a beam ID can be used as a cyclic shift value of the ZC sequence. For example, in a sequence $s_i^{(jL)}$, a root value is defined by $i \in \{25,29,34\}$ and a cyclic shift value is defined by $jL \in \{0,L,2L,3L\}$. In this case, L corresponds to a system parameter value and is configured to be larger than a delay spread maximum value of a channel in general. The UE can identify 3 cells and 4 beams of each cell using the sequence $s_i^{(jL)}$. This procedure can be represented as equation 24 described in the following.

$$\{\hat{t}_0, \hat{i}, \hat{j}\} = \underset{\hat{t}_0, i, j}{\mathrm{argmax}}\left[\left|\left(s_i^{\hat{j}}\right)^H r[\hat{t}_0]\right|^2\right] \qquad \text{[Equation 24]}$$

The UE performs timing synchronization, cell ID estimation, and beam ID estimation at the same time through the equation 24. FIG. 20 shows the procedure.

Referring to FIG. 20, a UE is configured to include 12 correlators in total to identify 3 cells and 4 beams at the same time and the 12 correlators operate together in every time slot. In case of legacy LTE, since it is necessary to identify a cell only, the UE is configured to include 3 correlators in total. On the contrary, in case of mmWave communication system, since a beam scanning procedure is included in the system, it is required to have processing power greater than LTE as much as 4 times. Consequently, according to the aforementioned scheme, calculation complexity required for the UE to perform a synchronization procedure increases as much as 4 times.

Figure 21:
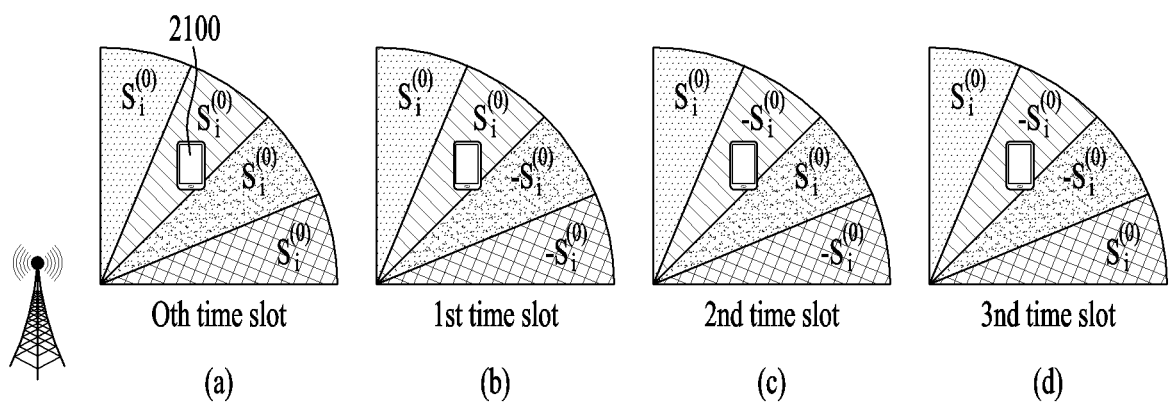
FIGS. 21 to 23 illustrate a synchronization signal and a beam scanning signal transmission structure according to a proposed embodiment.
Figure 22:
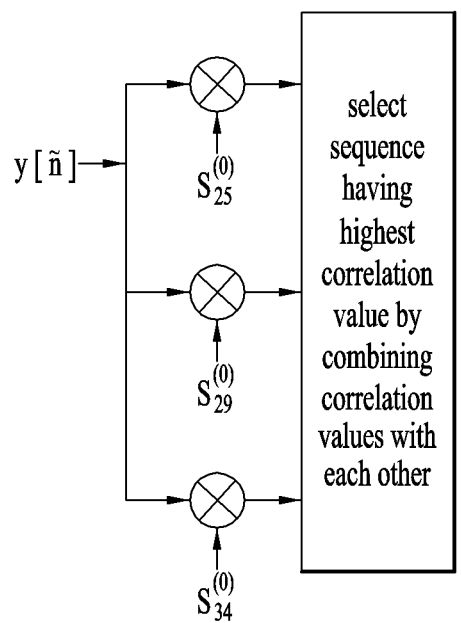
Figure 23:
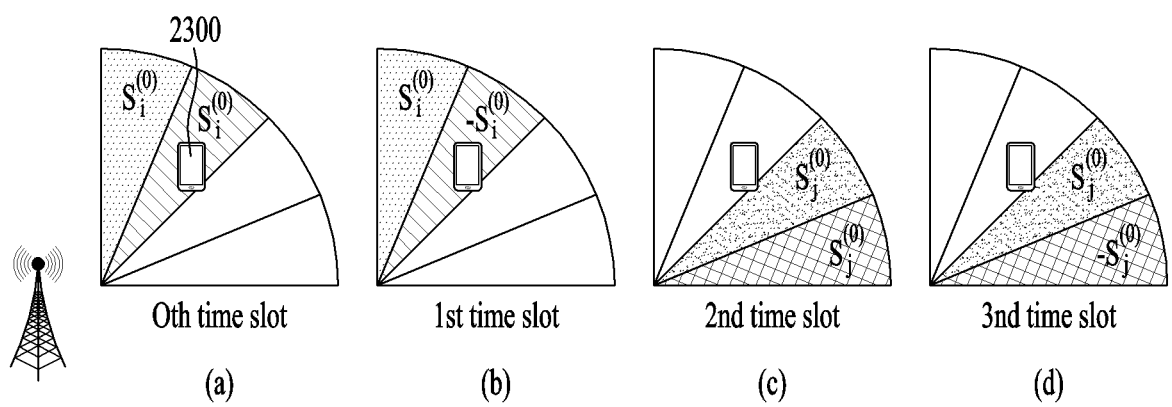

Hence, in the following, an embodiment for enhancing complexity of a UE in a synchronization procedure and a beam scanning procedure is proposed. FIGS. 21 to 23 illustrate a transmission structure of a synchronization signal and a beam scanning signal according to a proposed embodiment. According to the proposed embodiment, a beam ID is defined as weights applied to a weighted sum for the aforementioned basic precoder (or, a second precoder).

For example, assume a case that the number of repeatedly transmitting a synchronization signal corresponds to 2. Equation 25 described in the following illustrates a synchronization signal codebook when a repetition count corresponds to 2.

$$\begin{bmatrix} w[0] \\ w[1] \end{bmatrix} = \sqrt{\frac{P}{2}}\left(\begin{bmatrix} 1 & 1 \\ 1 & -1 \end{bmatrix} \otimes I_{N_T}\right)\begin{bmatrix} p_0 \\ p_1 \end{bmatrix} \qquad \text{[Equation 25]}$$

The equation 25 corresponds to the codebook mentioned earlier in the equation 11 represented by a weighted matrix $$\left(\begin{bmatrix} 1 & 1 \\ 1 & -1 \end{bmatrix}\right).$$

In the equation 25, each element of a first column $[1\ 1]^T$ corresponds to a weight of a basic precoder $p_0$ (second precoder) constructing w[0] according to time. Similarly, each element of a second column $[1\ -1]^T$ corresponds to a weight of a second precoder $p_1$ according to time. A base station and a UE determine the $[1\ 1]^T$ and the $[1\ -1]^T$ as a beam ID of the $p_0$ and a beam ID of the $p_1$, respectively. In other word, each column constructing a codebook (i.e., a weighted matrix), which is applied to transmit a synchronization signal, is used as a beam ID for identifying each beam in a beam scanning procedure. In particular, since the base station is able to forward a beam ID to the UE via a weighted matrix, the base station is able to forward a beam ID for the beam scanning procedure to the UE without additional signaling.

Similarly, when the number of repeatedly transmitting a synchronization signal corresponds to 4, equation 26 is explained.

$$\begin{bmatrix} w[0] \\ w[1] \\ w[2] \\ w[3] \end{bmatrix} = \sqrt{\frac{P}{4}}\left(\begin{bmatrix} 1 & 1 & 1 & 1 \\ 1 & 1 & -1 & -1 \\ 1 & -1 & 1 & -1 \\ 1 & -1 & -1 & 1 \end{bmatrix} \otimes I_{N_T}\right)\begin{bmatrix} p_0 \\ p_1 \\ p_2 \\ p_3 \end{bmatrix} \qquad \text{[Equation 26]}$$

The equation 26 corresponds to a codebook represented again using a weighted matrix when a repetition count of a synchronization signal corresponds to 4. Similar to the case of the equation 25, $1^{st}$, $2^{nd}$, $3^{rd}$, and $4^{th}$ columns of a weighted matrix are defined as beam IDs of $p_0$, $p_1$, $p_2$, $p_3$, respectively.

In the following, a procedure for a UE to perform beam scanning is explained in detail according to a proposed embodiment. In FIG. 21, for example, assume a case that a synchronization signal repetition count corresponds to 4 and the equation 26 is applied.

According to the embodiments mentioned earlier in FIGS. 8 to 12, as shown in FIG. 21, each beam is transmitted during 4 time slots within a sector. Referring to FIG. 21, unlike FIG. 19, 4 beams are transmitted at the same time in each time slot and a sign of a sequence varies according to a time slot. And, in FIG. 21, beams transmitted to each of regions belonging to a sector respectively correspond to $p_0$, $p_1$, $p_2$, $p_3$ from the top to the bottom. In particular, a beam transmitted to the topmost region corresponds to $p_0$ and a beam transmitted to the bottommost region corresponds to $p_3$.

If a synchronization signal is transmitted according to FIG. 21, a UE performs synchronization according to equation 27 described in the following and estimates a timing synchronization and a sequence (cell ID) of the synchronization signal. Unlike the equation 24, a beam scanning procedure for estimating a beam ID is not performed with a synchronization procedure at the same time in the equation 27.

$$\{\hat{t}_0, \hat{i}\} = \underset{\hat{t}_0, i}{\mathrm{argmax}}\left[\left|(s_i)^H r[\hat{t}_0]\right|^2\right]$$

If a UE performs synchronization only according to the equation 27, as mentioned earlier in the FIG. 22, the number of correlators of the UE is reduced to 4 from 12 of FIG. 20. If the number of correlators is reduced, since calculation complexity of the UE is considerably reduced, the aforementioned problem can be solved.

In the following, a procedure of performing beam scanning, which is performed after a UE estimates timing synchronization and a sequence, is explained.

The timing and the sequence index, which are determined according to the equation 27, are represented as $\hat{t}_o$, $\hat{i}$, respectively. And, when the $\hat{t}_o$, $\hat{i}$ are calculated, a correlation value between a reception signal and a sequence is defined as γ[t]. In this case, if there is no noise, a correlation value calculated in each time slot can be represented as equation 28 described in the following.

$$\begin{bmatrix} \gamma[0] \\ \gamma[1] \\ \gamma[2] \\ \gamma[3] \end{bmatrix} = \sqrt{\frac{P}{4}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} h_0 \\ h_1 \\ h_2 \\ h_3 \end{bmatrix} \quad \text{[Equation 28]}$$

where $\gamma[n] \triangleq s_i^H r[\hat{t}_n]$, $h[n] = p_n^T g$

The UE performs a beam scanning procedure based on the equation 28. First of all, if both sides of the equation 28 are multiplied by an inverse matrix, it may obtain equation 29 described in the following.

$$\begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} \gamma[0] \\ \gamma[1] \\ \gamma[2] \\ \gamma[3] \end{bmatrix} = \sqrt{4P} \begin{bmatrix} h_0 \\ h_1 \\ h_2 \\ h_3 \end{bmatrix} \quad \text{[Equation 29]}$$

If a matrix calculation is performed on the equation 29, a result can be represented by equation 30 described in the following.

$$\begin{bmatrix} |\gamma[0]+\gamma[1]+\gamma[2]+\gamma[3]|^2 \\ |\gamma[0]-\gamma[1]-\gamma[2]-\gamma[3]|^2 \\ |\gamma[0]-\gamma[1]+\gamma[2]-\gamma[3]|^2 \\ |\gamma[0]-\gamma[1]-\gamma[2]+\gamma[3]|^2 \end{bmatrix} = \begin{bmatrix} 4P|h_0|^2 \\ 4P|h_1|^2 \\ 4P|h_2|^2 \\ 4P|h_3|^2 \end{bmatrix} \quad \text{[Equation 30]}$$

A UE compares 4 power values obtained according to equation 30 and selects a biggest value from among the 4 power values. For example, if a value of $|\gamma[0]+\gamma[1]+\gamma[2]\gamma+[3]|^2$ corresponding to an element of a first row corresponds to a biggest value, the UE may comprehend it as $|h_0=p_0^T g|^2$ is greater than $|h_n=p_n^T g|^2$, n=2,3,4. In particular, the UE is able to know that a beam of a first region generated by $p_0$ is received with stronger power compared to beams of other regions. In other word, the UE is able to know that the UE is positioned at a first region within a sector. This is because the UE knows that the value of $|\gamma[0]+\gamma[1]+\gamma[2]+\gamma[3]|^2$ corresponds to a value calculated using a first raw[1 1 1 1] of a weight matrix and the $p_0$ is mapped to the [1 1 1 1] since the codebook is shared between the base station and the UE. In particular, since the UE is already knows a beam ID mapped to a column selected from the weight matrix, the UE can perform a beam scanning procedure by calculating the weight matrix without separately receiving a beam ID.

As a different example, if a value of an element $|\gamma[0]-\gamma[1]-\gamma[2]+\gamma[3]|^2$ corresponds to a biggest value in the equation 30, the UE is able to know that a value of $|h_3=p_3^T g|^2$ is the biggest. In particular, in FIG. 21, the UE is able to know that a beam of the last region generated by $p_3$ is received with greater power compared to beams of other regions. Hence, the UE is able to know that a position of the UE within a sector corresponds to the last region corresponding to the $p_3$.

According to the aforementioned procedure, although the base station does not separately generate and assign a beam ID for the beam scanning procedure, the UE can distinguish beams from each other using a weight matrix of a repeatedly received synchronization signal (i.e., the beam scanning procedure can be performed).

According to the aforementioned embodiments, although a sequence for a beam ID is not newly defined in the beam scanning procedure, the UE can distinguish beams from each other. Hence, when the UE performs timing estimation, the number of sequences to be searched by the UE is reduced to the number of cell IDs and synchronization complexity of the UE is considerably reduced.

According to one embodiment, it may be able to configure columns of a weight matrix to be orthogonal to each other. Equation 25 and equation 26 show weight matrixes when a repetition count corresponds to 2 and 4, respectively. In particular, if columns of a weight matrix are configured to be orthogonal to each other, a procedure of applying an inverse matrix of a weight matrix can be simplified in the equation 28.

If columns of a weight matrix are configured to be orthogonal to each other, it means that a vector corresponding to a weighted sum, which is applied to a basic (second) precoder in a specific time slot, is configured to be orthogonal to a vector corresponding to a weighted sum applied in a different time slot. This can also be comprehended as a codebook is designed to make each of vectors w[t] constructing a synchronization signal codebook {w[0], w[1], . . . , w[$N_R$-1]} to be orthogonal to each other. Since the vectors correspond to codes orthogonal to each other, the vectors can also be comprehended as OCC (orthogonal cover code).

In order to make each of vectors to be orthogonal to each other, a codebook can be designed using a hadamard matrix mentioned earlier in the equation 8 or a DFT matrix. The hadamard matrix can be simply generated for a random repeated number. Since values of each of elements are defined by addition and subtraction only, it may have a merit in that implementation complexity is very low. The DFT matrix can also be simply generated for a random repeated number. Values of each of elements are determined by $$e^{\frac{j2\pi n}{N}}, n \in \{0, \ldots, N-1\}$$

(N corresponds to a repeated number). For example, when a repeated number corresponds to 4, a DFT matrix can be generated as equation 31 described in the following.

$$\begin{bmatrix} 1 & 1 & 1 & 1 \\ 1 & -j & -1 & j \\ 1 & -1 & 1 & -1 \\ 1 & j & -1 & j \end{bmatrix} \quad \text{[Equation 31]}$$

In case of a DFT matrix, if a repeated number corresponds to 2, the DFT matrix has complexity identical to complexity of the hadamard matrix. If a repeated number is equal to or less than 4, it may be able to simply generate the DFT matrix. Although the repeated number exceeds 4, it may be able to minimize the increase of the complexity using FFT (Fast Fourier Transform).

In FIG. 23, an embodiment different from the embodiments of FIGS. 21 and 23 is explained. According to the embodiment of FIG. 23, a beam ID can be defined not only by a weight applied to a basic precoder but also by a sequence. If a channel is quickly changed while a synchronization signal is repeatedly transmitted according to the embodiments mentioned earlier in FIGS. 21 and 22, performance of beam scanning can be deteriorated. In order to minimize the performance deterioration, the embodiment shown in FIG. 23 proposes a method of generating a beam ID in consideration of a sequence in addition to a weight matrix.

Referring to FIGS. 23(a) and (b), a base station transmits $p_0$, $p_1$ at the same time during two contiguous time slots. Referring to FIGS. 23(c) and (d), the base station transmits $p_2$, $p_3$ at the same time during two contiguous time slots.

In this case, in order to make the $p_0$, $p_1$ to be distinguished from each other, weights applied to the $p_0$, $p_1$ are defined by $[1\ 1]^T$ and $[1\ -1]^T$, respectively. Similarly, in order to make the $p_2$, $p_3$ to be distinguished from each other, weights applied to the $p_2$, $p_3$ are defined by $[1\ 1]$ and $[1\ -1]$, respectively. In this case, a UE can distinguish the $p_0$, $p_1$ from the $p_2$, $p_3$ via the procedures mentioned earlier in the equations 28 to 30.

Meanwhile, in order to distinguish the $p_0$, $p_1$ transmitted in the first two time slots from the $p_2$, $p_3$ transmitted in a next two time slots, the base station allocates a sequence $s_i$ in the first two time slots (FIGS. 23(c) and (d)) and allocates a sequence $s_j$, $j \neq i$ in the next two time slots (FIGS. 23(c) and (d)). In this case, since a sequence is additionally allocated to distinguish two regions positioned at the top from two regions positioned at the bottom within a section, the number of correlators of the UE increases as many as the additional sequence.

According to the embodiment mentioned earlier in FIG. 23, since a section of which a channel should not be changed is reduced to two time slots, it becomes a scheme robust to a rapid change of a channel.

Figure 24:
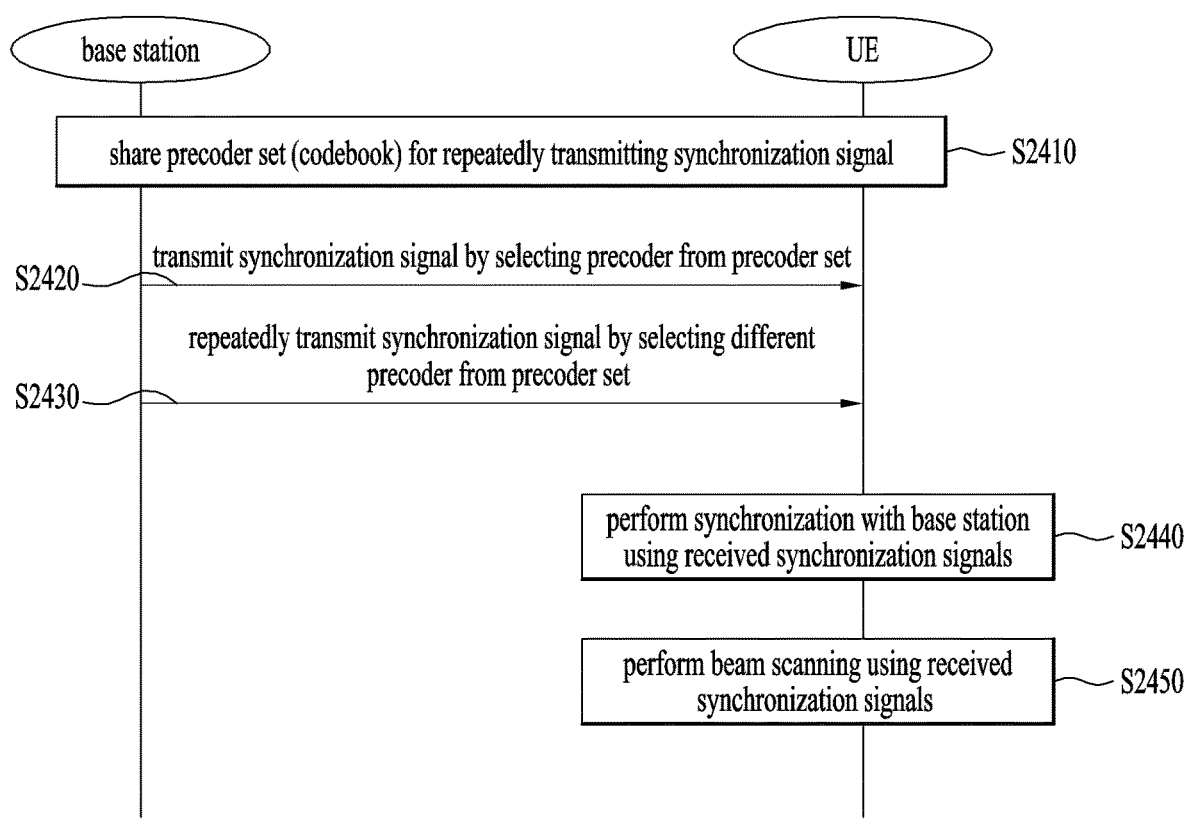
FIG. 24 is a flowchart for a synchronization procedure and a beam scanning procedure according to a further different embodiment.

FIG. 24 is a flowchart for a synchronization procedure and a beam scanning procedure according to a further different embodiment. In FIG. 24, the aforementioned embodiments are explained according to a time flow. In particular, although it is not explicitly described in FIG. 24, the contents mentioned earlier in FIGS. 19 to 23 can be identically or similarly applied.

First of all, a base station and a UE share a precoder set (i.e., a codebook) for repeatedly transmitting a synchronization signal [S2410]. The codebook can include third precoders configured by weighted sums of second precoders. A weighted sum is differently applied to each of the second precoders. In this case, each of weighted sum vectors (i.e., OCC) for generating the third precoders included in the precoder set can be configured to be orthogonal to each other. Meanwhile, as mentioned earlier in FIG. 12, the codebook can be transmitted to the UE in a manner of being generated by the base station. Or, the UE may directly generate the codebook. In this case, as mentioned in the foregoing description, a weighted sum applied to each of the third precoders indicates a beam ID of the base station.

Subsequently, the base station transmits a synchronization signal by selecting one from among third precoders constructing the precoder set (codebook) [S2420]. A precoder can be randomly selected from among the third precoders included in the precoder set as a third precoder applied to the synchronization signal. Subsequently, the base station selects a different third precoder from the precoder set (codebook) in a next OFDM symbol and repeatedly transmits the synchronization signal [S2430]. In the step S2430, a third precoder rather than the precoder selected in the step S2420 is selected from the precoder set. In FIG. 24, it is assumed a case that the number of repeatedly transmitting the synchronization signal corresponds to 2. If the repetition count is higher, the step S2430 can be repeatedly performed.

The UE performs synchronization with the base station using the repeatedly received synchronization signal [S2440]. This step can be comprehended as a step of estimating a best value by calculating a correlation between timing of the synchronization signal received by the UE and a sequence. When the UE calculates the correlation, the step S2440 may apply an embodiment of storing median values in a stack and retrieving the values according to the embodiments mentioned earlier in FIGS. 10 and 11.

If timing and a sequence are estimated in every time slot in the step S2440 and synchronization is completed, the UE performs a beam scanning procedure using the synchronization signals received in the steps S2420 and S2430 [S2450]. In particular, the UE performs the procedures mentioned earlier in the equations 28 to 30 on a correlation value obtained by performing synchronization in every time slot. Hence, the UE is able to determine a beam received with strongest power among a plurality of beams. The UE is able to identify a position (i.e., subsector) of the UE within a sector via the beam scanning procedure.

If the base station introduces OCC to a codebook through the aforementioned procedure, the base station can make the UE perform beam scanning without allocating an additional sequence for the beam scanning to the UE. Hence, the UE can minimize the increase of complexity for implementing the beam scanning procedure.

5. Proposed Synchronization Procedure and Beam Scanning Procedure 2

5.1 Beam Broadening Technique

Figure 25:
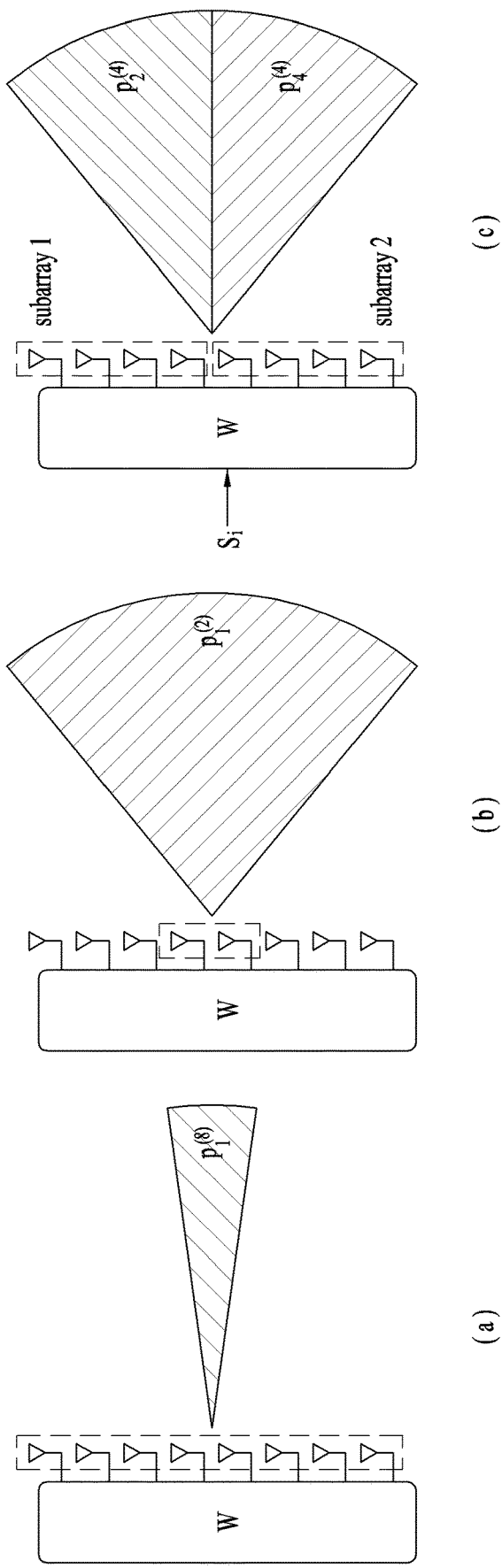
FIG. 25 is a diagram for explaining a beam extension scheme.

In FIGS. 25(a), (b), and (c), a beam broadening technique is explained first before a proposed embodiment is explained. When a size of a linear antenna array corresponds to $N_t$, a beamforming gain is proportional to $N_t \log_{10}(N_t)$. Yet, a beamwidth or a HPBW (half power beamwidth) is inversely proportional to the $N_t$. In particular, as the size of the linear antenna array is getting bigger, it may be able to obtain a better beamforming gain while a beamwidth is getting narrower.

Meanwhile, a broadcast channel or a control channel requires a wide beamwidth due to the characteristic of the channel while requiring a low SNR. Hence, it is not necessary for the channel to have a relatively higher beamforming gain. In this case, an antenna array of a big size requires a new beamforming design to satisfy the abovementioned characteristic. A beamforming design described in the following is referred to as a beam broadening technique.

FIG. 25(a) illustrates a beamwidth according to 8 antenna arrays. In FIG. 25(a), a width of a beam generated by an antenna array configured by 8 antennas corresponds to 15' and w corresponds to a vector indicating a coefficient of a linear antenna array. And, $P_1^{(8)}$ indicates a first column of a DFT matrix of a size of 8. In FIG. 25(a), such a relation as $W = P_1^{(8)}$ is satisfied.

FIG. 25(b) illustrates a result that a beam broadening technique is applied in the antenna array shown in FIG. 25(a). FIG. 25(b) illustrates a beamwidth when 2 antennas are operated (on) only among 8 antennas and the remaining antennas do not operate (off). In FIG. 25(b), $P_1^{(2)}$ indicates a first column of a DFT matrix of a size of 2. In FIG. 25(a), such a relation as $$W = \begin{bmatrix} 0 & 0 & 0 & (P_1^{(2)})^T & 0 & 0 & 0 \end{bmatrix}^T$$

is satisfied.

Referring to FIG. 25(b), the number of antennas involved in beamforming is reduced by 25 percent, a beamwidth is broadened to 60' from 15' (4 times), and a beamforming gain is reduced as much as 6.6227 dB. According to the scheme shown in FIG. 25(b), not only a beamforming loss but also a power loss occurs when an AAS (active antenna system) to be described later is assumed. In particular, efficiency of the scheme is low.

FIG. 25(c) illustrates a result to which a different beam broadening technique is applied. Referring to FIG. 25(c), 8 antennas are classified into 2 subarrays and each of the subarrays is defined by 4 contiguous antennas. The first subarray and the second subarray respectively have a coefficient of a second column and a coefficient of a fourth column $P_2^{(4)}$, $P_4^{(4)}$ of a DFT matrix of a size of 4 and satisfy such a relation as $$W = \left[ (P_2^{(4)})^T \quad (P_4^{(4)})^T \right]^T.$$

Referring to FIG. 25(c), each subarray includes 4 antennas and has a beamwidth of 30'. A beamforming gain is reduced as much as 4.8165 dB. Meanwhile, since two subarrays are beamformed in a different direction, total beamwidth satisfies 60'. Compared to the technique mentioned earlier in FIG. 25(b), since all antennas operate, a beam broadening technique shown in FIG. 25(c) does not have a power loss. Moreover, sizes of all antenna coefficients are the same (i.e., 1) while multiple beams (2 beams) are transmitted.

In general, when a size of a linear antenna array corresponds to $N_t$ and a beam broadening technique is applies using M number of subarrays, a ratio of a broadened beam becomes $M^2$. Consequently, the beam broadening technique, which has introduced a subarray concept shown in FIG. 25(c), can broaden a beamwidth while using all antennas.

5.2 Proposed Embodiment 1

In the following, a synchronization method and a beam scanning method to which the aforementioned subarray concept is applied are proposed with reference to FIGS. 26 to 31. First of all, a subarray concept and a synchronization method to which a beam broadening technique is applied are described.

A process of transmitting a plurality of beams during 4 time slots has been explained in FIG. 21. In an embodiment of FIG. 21, as mentioned earlier in equation 12, a precoder applied to a synchronization signal corresponds to a weighted sum of basic precoders (or, second precoders). In this case, a size of each element of a synchronization signal precoder is different. For example, assume that basic precoders $p_0^{(4)}$, $p_1^{(4)}$ correspond to columns different from each other of a DFT matrix of a size of 4 and are defined as equation 32.

$$p_0^{(4)} = \frac{1}{2}[1 \quad 1 \quad 1 \quad 1]^T, p_1^{(4)} = \frac{1}{2}[1 \quad j \quad -1 \quad -j]^T \quad \text{[Equation 32]}$$

The synchronization signal codebook mentioned earlier in FIG. 21 can be defined as equation 33 based on the equation 32.

$$w[0] = \frac{1}{\sqrt{2}}(p_0^{(4)} + p_1^{(4)}) = \frac{1}{2\sqrt{2}}[2 \quad 1+j \quad 0 \quad 1-j] \quad \text{[Equation 33]}$$

-continued
$$w[1] = \frac{1}{\sqrt{2}}(p_0^{(4)} - p_1^{(4)}) = \frac{1}{2\sqrt{2}}[0 \quad 1-j \quad 2 \quad 1+j]$$

In particular, in case of a precoder generated by a weighted sum, unlike a basic precoder, the precoder has a different element size.

Figure 26:
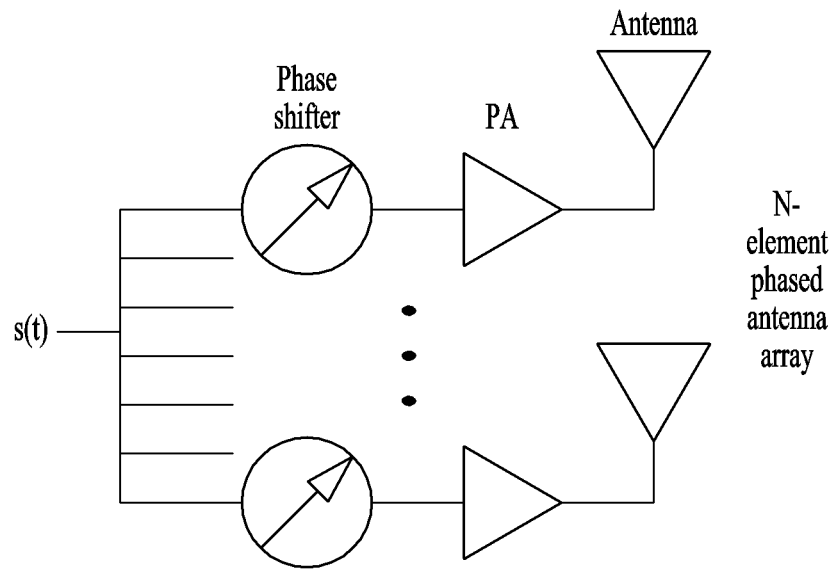
FIG. 26 is a diagram for explaining an AAS (active antenna system).

Meanwhile, in case of mmWave system, as shown in FIG. 26, it may consider an AAS including a phase shifter and a power amplifier according to an individual antenna. In this case, a phase and a size of each of elements of a synchronization signal precoder are implemented by a phase shifter and a power amplifier of an individual antenna corresponding to a corresponding element.

In order to minimize a power loss under the AAS antenna structure, it is necessary to transmit a signal by changing a phase according to each antenna in a state that outputs of power amplifiers of all antennas are configured to be the same. This procedure is performed under the premise that a coefficient of a precoder is the same. However, as mentioned in the foregoing description, since a precoder coefficient of a synchronization signal varies according to a configuration of an antenna, it is unable to satisfy the abovementioned condition and it leads to a power loss.

Figure 27:
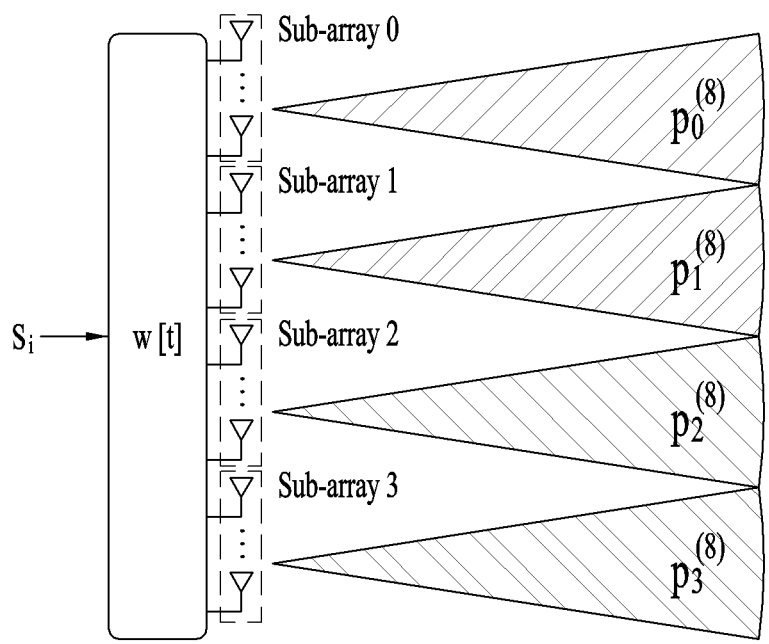
FIGS. 27 to 31 are diagrams for explaining a synchronization procedure and a beam scanning procedure using a subarray concept according to an embodiment of the present invention.

Hence, as mentioned in the foregoing description, it may consider a beam broadening technique to which a subarray concept is applied. The beam broadening technique corresponds to a technique of transmitting a beam by independently controlling each of subarrays by grouping the entire antennas. In this case, it is able to control a beam direction by adjusting a phase only in a state that outputs of power amplifiers of the entire antennas are fixed to be the same. For example, FIG. 27 illustrates an example of an antenna array that the number of antennas corresponds to 32 and the number of subarrays corresponds to 4. In this case, each of the subarrays is configured to have 8 antennas and generates a beam of which a beamwidth corresponds to 15'. And, since each of the subarrays is able to individually control a direction of a generated beam, it may be able to implement a beam structure shown in FIG. 27.

In FIG. 27, a precoder corresponding to each of the subarrays is defined by $p_0^{(8)}$, $p_1^{(8)}$, $p_2^{(8)}$, $p_3^{(8)}$. In this case, a coefficient size of each precoder is the same and a phase is different only. Consequently, it may be able to solve an output issue in the AAS antenna structure by utilizing the beam broadening technique.

In the following, a synchronization procedure and a beam scanning procedure based on the beam broadening technique are explained in detail.

According to a proposed embodiment, a synchronization signal precoder used in a synchronization procedure is defined by a stack of two or more basic precoders (or, the aforementioned second precoder). In this case, each of synchronization signal precoders is defined by differentiating a weight of each of the basic precoders. A concept of defining a synchronization signal precoder using a stack of basic precoders is explained in more detail with reference to equation 34 described in the following.

$$w[0] = \sqrt{\frac{P}{4}} \begin{bmatrix} p_0^{(8)} \\ p_1^{(8)} \\ p_2^{(8)} \\ p_3^{(8)} \end{bmatrix}, w[1] = \sqrt{\frac{P}{4}} \begin{bmatrix} p_0^{(8)} \\ p_1^{(8)} \\ -p_2^{(8)} \\ -p_3^{(8)} \end{bmatrix}, \quad \text{[Equation 34]}$$

$$w[2] = \sqrt{\frac{P}{4}} \begin{bmatrix} p_0^{(8)} \\ -p_1^{(8)} \\ p_2^{(8)} \\ -p_3^{(8)} \end{bmatrix}, w[3] = \sqrt{\frac{P}{4}} \begin{bmatrix} p_0^{(8)} \\ -p_1^{(8)} \\ -p_2^{(8)} \\ p_3^{(8)} \end{bmatrix},$$

where $\|p_j^{(8)}\|^2 = 1, \forall j$ $$|p_j^{(8)}(i)|^2 = \frac{1}{8}, \forall i$$

In equation 34, $p_n^{(N)}$ corresponds to an $n^{th}$ basic precoder having a size of N. Each of 4 precoders (i.e., third precoder) $w[t]$ (t=0, 1, 2, 3) constructing a synchronization signal codebook is defined in a manner that 4 contiguous basic precoders configure a single column. In particular, each of the precoders included in the synchronization signal codebook is designed in a form that 4 basic precoders $p_0^{(8)}$, $p_1^{(8)}$, $p_2^{(8)}$, $p_3^{(8)}$ are concatenated in a column direction. In this case, a weight of each of the basic precoders is differently defined according to a third precoder. In equation 34, $$|p_j^{(8)}(i)|^2 = \frac{1}{8}, \forall i$$

indicates an $i^{th}$ coefficient of the basic precoders and it indicates that sizes of all coefficients of the basic precoders are the same. And, all coefficients of the third precoders constructing the synchronization signal codebook have the same coefficient size $$\left(\frac{1}{\sqrt{8}}\right).$$

This is different from the embodiments mentioned earlier in equations 32 and 33.

Meanwhile, if the number of subarrays is represented by $N_A$ (4 in FIG. 27), third precoder $w[t]$ is defined as equation 35 described in the following.

$$w[t]=(\text{diag}\{d[t]\}\otimes I_{N_T})P_{N_A}^T \quad \text{[Equation 35]}$$

where $P_{N_A}^T = [p_0^T \ p_1^T \ \ldots \ p_{N_A-1}^T]^T$

In equation 35, diag $\{d[t]\}$ corresponds to a diagonal matrix having a vector d [t] of a size of $N_A$ as a diagonal component. As shown in equation 36, the vector d[t] can be defined by a matrix. The matrix shown in equation 36 becomes the aforementioned weight matrix. A size of the weight matrix corresponds to $N_R \times N_A$.

$$D_{N_R} = [d[0]d[1] \ \ldots \ d[N_R-1]]^T \quad \text{[Equation 36]}$$

The third precoders defined by equations 34 to 36 are configured by a plurality of concatenated basic precoders. Each of the basic precoders performs beamforming by independently controlling an antenna subarray.

In the following, a beam scanning procedure to which a subarray concept and a beam broadening technique are applied is explained. If a synchronization signal is transmitted according to equations 34 to 36, a signal received by a UE can be represented as equation 37 described in the following.

$$\begin{bmatrix} \gamma[0] \\ \gamma[1] \\ \gamma[2] \\ \gamma[3] \end{bmatrix} = \sqrt{\frac{P}{4}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} h_0 \\ h_1 \\ h_2 \\ h_3 \end{bmatrix} \quad \text{[Equation 38]}$$

In equation 37, if a correlation value between a reception signal r[t] and a sequence $s_i$ is defined by $\gamma[n] \triangleq s_i^H r[n]$, the equation 37 can be represented as equation 38 described in the following.

$$\begin{bmatrix} r[0] \\ r[1] \\ r[2] \\ r[3] \end{bmatrix} = \sqrt{\frac{P}{4}} \begin{bmatrix} p_0^T & p_1^T & p_2^T & p_3^T \\ p_0^T & p_1^T & -p_2^T & -p_3^T \\ p_0^T & -p_1^T & p_2^T & -p_3^T \\ p_0^T & -p_1^T & -p_2^T & p_3^T \end{bmatrix} \begin{bmatrix} g_0 \\ g_1 \\ g_2 \\ g_3 \end{bmatrix} s_i^T = \quad \text{[Equation 37]}$$

$$\sqrt{\frac{P}{4}} \begin{bmatrix} h_0 + h_1 + h_2 + h_3 \\ h_0 + h_1 - h_2 - h_3 \\ h_0 - h_1 + h_2 - h_3 \\ h_0 - h_1 - h_2 + h_3 \end{bmatrix} s_i^T$$

where $h_i \triangleq p_i^T g_i$

The equation 38 is identical to the equation 28. This indicates that a beam scanning procedure to which a subarray concept and a bean broadening technique are applied can be performed in a manner of being identical to the process of the aforementioned embodiment. In particular, although a base station does not generate or allocate an additional beam ID for performing a beam scanning procedure, a UE is able to distinguish beams from each other using a weight matrix of a repeatedly received synchronization signal according to the embodiment mentioned earlier in equations 28 to 30 (i.e., a beam scanning procedure is performed). The UE can estimate reception power of each of beams in the beam scanning procedure and selects a beam of the best reception power.

According to the aforementioned embodiments, a synchronization signal codebook is defined by third precoders, which are generated by concatenating basic precoders, by utilizing a point that a coefficient size of the synchronization signal codebook is the same. In particular, it may be able to design a beam scanning procedure using a scheme identical to the aforementioned scheme while a power loss is minimized in a synchronization procedure.

Figure 28:
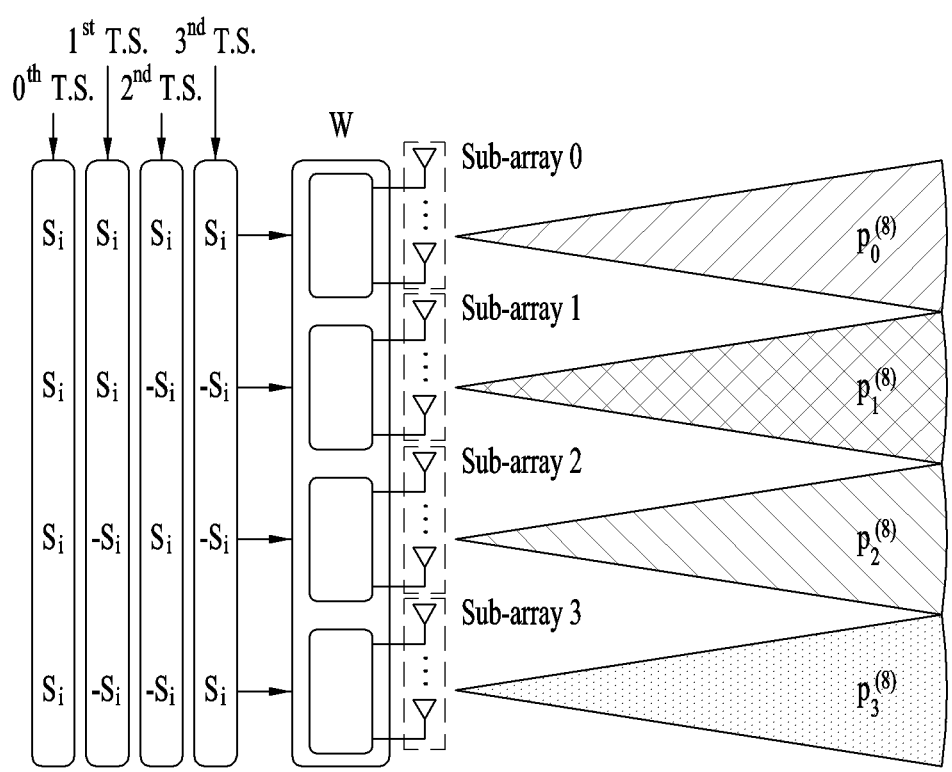

FIG. 28 illustrates an embodiment of a different proposed scheme. According to the embodiment of FIG. 28, a sequence inputted to each RF (radio frequency) chain is changed in every time slot in a state that a synchronization signal precoder is fixed in all time slots. FIG. 27 illustrates a scheme of differently designing a third precoder in every time slot while the same synchronization sequence is inputted in all time slots. On the contrary, FIG. 28 illustrates a scheme of differently inputting a synchronization sequence in every time slot while a third precoder is identically maintained.

An RF chain is installed in a subarray shown in FIG. 28 in a manner of being connected. A synchronization sequence $s_i$ is inputted via each RF chain and a different synchronization sequence can be delivered and inputted according to each RF chain. For example, the $s_i$ is transmitted at all time slots in a $0^{th}$ subarray. On the contrary, sequences are inputted in an order of $s_i \rightarrow s_i \rightarrow -s_i \rightarrow -s_i$ in a $1^{st}$ subarray during 4 time slots (T.S.)

In this case, a synchronization signal precoder (third precoder) w is defined as equation 39 and has the same value during 4 time slots.

$$w = \sqrt{\frac{P}{4}} \begin{bmatrix} p_0^{(8)} \\ p_1^{(8)} \\ p_2^{(8)} \\ p_3^{(8)} \end{bmatrix}$$ [Equation 39]

In an embodiment of FIG. 28, a reception signal of a UE is represented as equation 40.

$$\begin{bmatrix} r[0] \\ r[1] \\ r[2] \\ r[3] \end{bmatrix} = \sqrt{\frac{P}{4}} \begin{bmatrix} s_i p_0^T & s_i p_1^T & s_i p_2^T & s_i p_3^T \\ s_i p_0^T & s_i p_1^T & -s_i p_2^T & -s_i p_3^T \\ s_i p_0^T & -s_i p_1^T & s_i p_2^T & -s_i p_3^T \\ s_i p_0^T & -s_i p_1^T & -s_i p_2^T & s_i p_3^T \end{bmatrix} \begin{bmatrix} g_0 \\ g_1 \\ g_2 \\ g_3 \end{bmatrix} =$$ [Equation 40]

$$\sqrt{\frac{P}{4}} \begin{bmatrix} h_0 + h_1 + h_2 + h_3 \\ h_0 + h_1 - h_2 - h_3 \\ h_0 - h_1 + h_2 - h_3 \\ h_0 - h_1 - h_2 + h_3 \end{bmatrix} s_i^T$$

where $h_i \triangleq p_i^T g_i$

The rightmost side of equation 40 is identical to the rightmost side of equation 37. Consequently, although an inputted synchronization sequence is changed according to a time slot instead of the scheme of FIG. 27 that changes a synchronization signal precoder according to a time slot, it may be able to obtain the same result. This indicates that the synchronization procedure and the beam scanning procedure mentioned earlier in FIG. 27 can also be identically performed on the case of FIG. 28.

Figure 29:
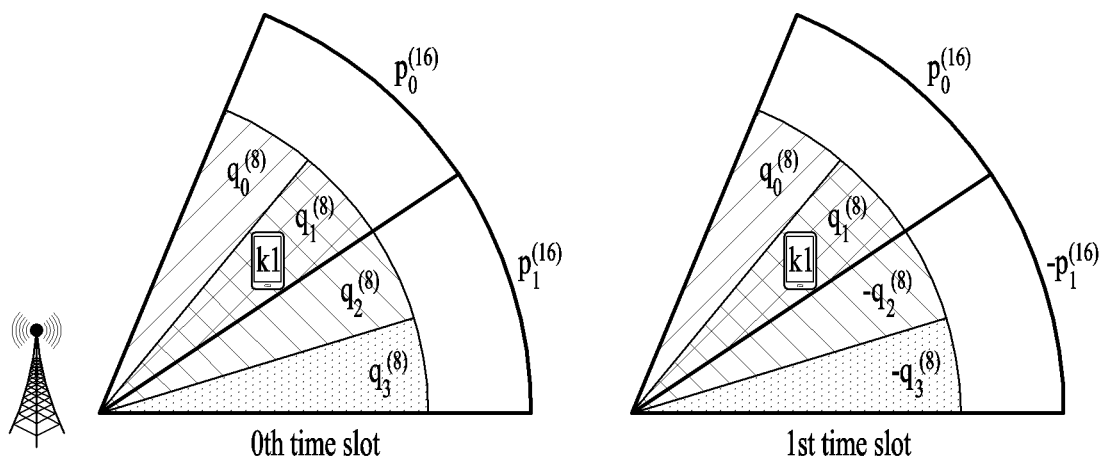
Figure 30:
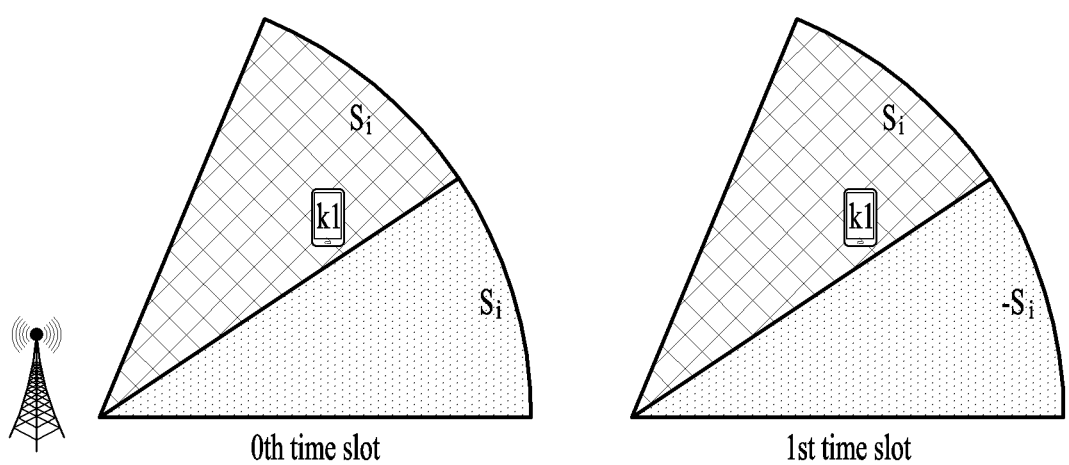

FIGS. 29 and 30 illustrate a further different proposed embodiment. As mentioned in the foregoing description, third precoders constructing a codebook are defined by a plurality of concatenated basic precoders (second precoders). In this case, according to the proposed embodiment, the basic precoders can be defined by concatenating two or more first precoders. According to the present embodiment, a beam of the second precoder includes beams of the concatenated first precoders.

Referring to FIG. 29, as shown in equation 41, second precoders $\{p_0^{(16)}, p_1^{(16)}\}$ are defined by concatenating first precoders $\{q_0^{(8)}, q_1^{(8)}, q_2^{(8)}, q_3^{(8)}\}$. In the equation 41, an upper subscript of a precoder corresponds to a size of the precoder and a lower subscript of a precoder corresponds to an index of the precoder.

$$p_0^{(16)} = \begin{bmatrix} q_0^{(8)} \\ q_1^{(8)} \end{bmatrix}, p_1^{(16)} = \begin{bmatrix} q_2^{(8)} \\ q_3^{(8)} \end{bmatrix}$$ [Equation 41]

In FIG. 29, a beam $p_0^{(16)}$ is designed to include two beams $\{q_0^{(8)}, q_1^{(8)}\}$. In particular, according to the embodiment of FIG. 29, a basic (second) precoder having a beam of a wide beamwidth (30') is defined by concatenating first precoders having a beam of a narrow beam width (15'). Moreover, a synchronization signal codebook, which is defined by concatenating basic precoders, can be represented as equation 42 described in the following.

$$w[0] = \sqrt{\frac{P}{2}} \begin{bmatrix} p_0^{(16)} \\ p_1^{(16)} \end{bmatrix}, w[1] = \sqrt{\frac{P}{2}} \begin{bmatrix} p_0^{(16)} \\ -p_1^{(16)} \end{bmatrix}$$ [Equation 42]

FIG. 30 illustrates a sequence $s_i$ transmitted to each beam using a synchronization signal codebook of equation 42. In an embodiment of FIG. 30, a UE is able to identify $\{p_0^{(16)}, p_1^{(16)}\}$ having a beam of a wide beamwidth. On the contrary, the UE is unable to identify $\{q_0^{(8)}, q_1^{(8)}, q_2^{(8)}, q_3^{(8)}\}$ having a beam of a narrow beamwidth. In particular, according to the embodiment of FIG. 30, not only time slots required for transmitting a sequence but also beam resolution is reduced by half compared to the embodiment of FIG. 21.

Figure 31:
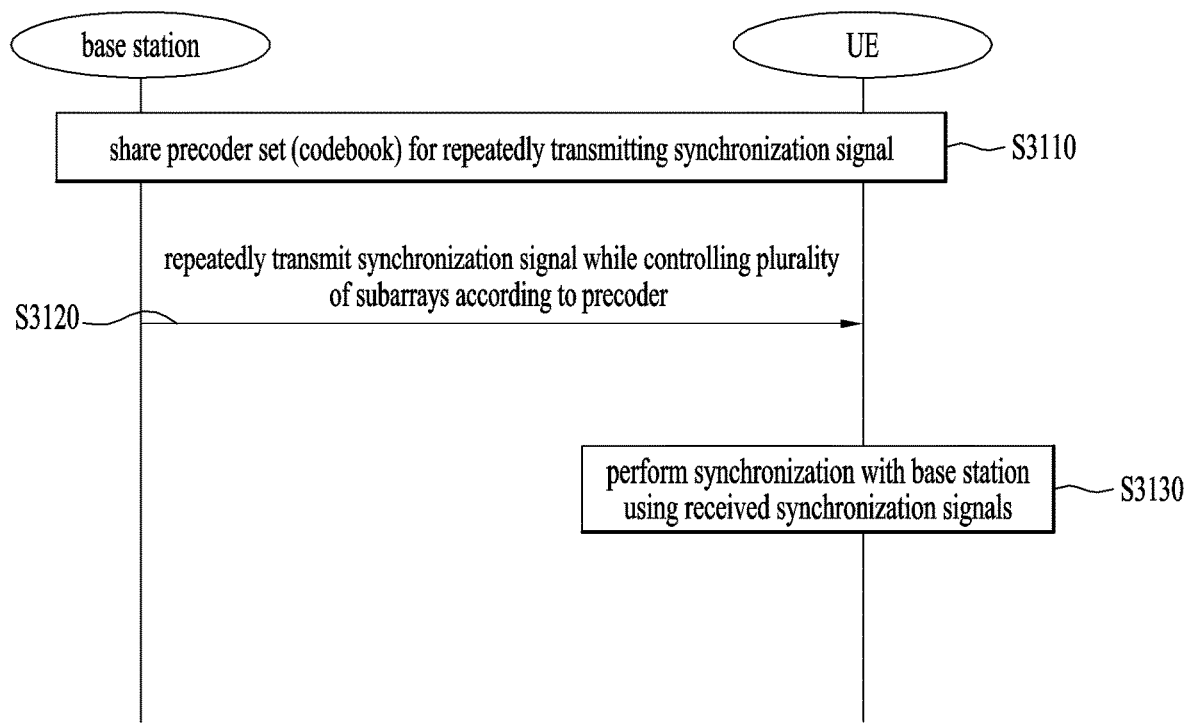

FIG. 31 is a flowchart for a synchronization method according to a proposed embodiment. In FIG. 31, the embodiments mentioned earlier in FIGS. 25 to 30 are illustrated and explained according to a time flow. Although it is not explicitly described in FIG. 31, the previously described contents can be identically or similarly applied.

First of all, a set of precoders (i.e., codebook) for repeatedly transmitting a synchronization signal is shared between a base station and a UE [S3110]. The codebook can be configured by third precoders which are generated by concatenating second precoders. In order to configure the third precoders, a weight applied to each of the second precoders can be differently configured for each of a plurality of third precoders that construct the set of precoders. In this case, the weight applied to the second precoders has the same size and a different phase. Each of the second precoders corresponds to an antenna subarray of a part of antennas that constructs an antenna array of a base station. Meanwhile, the codebook is generated by the base station and can be transmitted to the UE. Or, the codebook can be directly generated by the UE.

Subsequently, the base station selects one from among the third precoders constructing the set of precoders (codebook) to transmit a synchronization signal [S3120]. One of the third precoders included in the set of precoders can be randomly selected as a third precoder applied to the synchronization signal. Subsequently, the base station selects a different third precoder from the set of precoders in a next OFDM symbol to repeatedly transmit a synchronization signal. The base station transmits a synchronization signal by selecting a third precoder rather than a previously selected third precoder in each repetition process.

In the step S3120, the base station controls antenna subarrays via each of a plurality of concatenated second precoders constructing a third precoder. Since each of the second precoders corresponds to an antenna subarray, the base station can achieve a beam broadening technique by controlling a plurality of antenna subarrays via a third precoder applied in a time slot.

The UE performs synchronization with the base station using a repeatedly received synchronization signal [S3130]. This process can be comprehended as a process of the UE that estimates an optimal value by calculating a correlation between timing of the received synchronization signal and a sequence. And, similar to the embodiments mentioned earlier in FIGS. 10 and 11, when the UE calculates the correlation, an embodiment of storing median values in a stack and calling the values can be applied to the step S3130.

Although it is not explicitly described in FIG. 31, if timing and a sequence are estimated in every time slot and synchronization is completed, the UE may perform a scanning process using repeatedly received synchronization signals. In particular, the UE performs the procedures mentioned earlier in equations 28 to 30 on a correlation value obtained by performing synchronization in every time slot. By doing so, the UE is able to determine a beam received with strongest power among a plurality of beams. The UE is able to identify a location (i.e., subsector) of the UE within a sector through the beam scanning procedure. The procedure mentioned earlier in FIG. 24 can be similarly applied to the beam scanning procedure.

In the foregoing description, an embodiment of differently selecting a third precoder according to a time slot has been described with reference to FIG. 31. Meanwhile, it may utilize a single third precoder only according to the embodiment mentioned earlier in FIG. 28. In particular, if a base station changes a sequence inputted into an RF chain corresponding to each antenna subarray in every time slot, it may obtain a result similar to the case of FIG. 27 while utilizing a single third precoder only. Moreover, as mentioned in the foregoing description, each of second precoders constructing a third precoder can be defined by concatenating a plurality of first precoders.

According to the aforementioned embodiments, when precoders constructing a precoder set are designed, if a plurality of precoders are concatenated, it is able to minimize a power loss at the time of transmitting a synchronization signal.

The abovementioned technique is distinguished from a hybrid beamforming technique. The hybrid beamforming technique corresponds to a technique that reduces feedback burden of a UE by reducing a digital beamforming process while analog beamforming is fixed. On the contrary, according to a proposed embodiment, a beam broadening technique is applied by differently defining analog beamforming according to an antenna subarray. In case of the hybrid beamforming, since envelop of beamforming is fixed, the hybrid beamforming is not appropriate for transmitting a synchronization signal. On the contrary, according to the proposed embodiment, since beamforming is widely broadened, it may be able to more efficiently transmit a synchronization signal.

5.3 Proposed Embodiment 2

In the following, a further different embodiment of a synchronization procedure and a beam scanning procedure using a subarray concept is proposed with reference to FIGS. 32 to 34. The contents mentioned earlier in FIG. 28 are explained in more detail in FIGS. 32 to 34.

First of all, similar to FIG. 28, assume that a third precoder applied to all subarrays is fixed. In this case, the third precoder is defined according to what is mentioned earlier in equation 39 and is fixed during 4 time slots. Moreover, a reference sequence $s_i$ is inputted to an antenna subarray via an RF chain over 4 time slots and the reference sequence can be multiplied by a prescribed weight in every time slot. A sequence of which the reference sequence is multiplied by the weight is referred to as a synchronization sequence. The weight can be comprehended as the aforementioned OCC (orthogonal cover code) and can be differently determined according to an antenna subarray (or, RF chain). A series of matrixes, which are generated in a manner that a reference sequence is multiplied by a weight over a prescribed time slot, are defined as a signature. In particular, the signature is a concept corresponding to a synchronization sequence defined for a single antenna subarray. Since signatures are independent from each other, a UE receiving the signatures can distinguish the signatures from each other.

Figure 32:
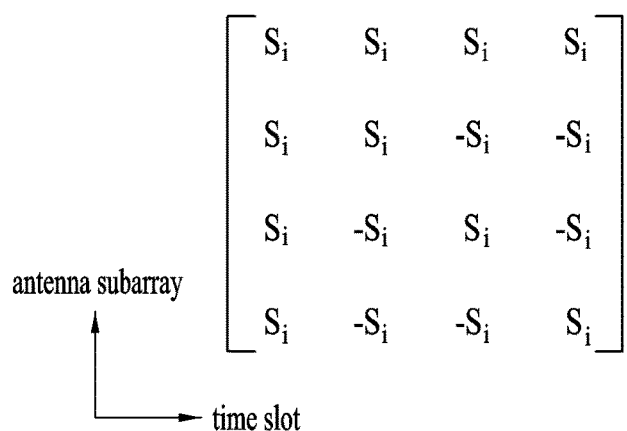
FIGS. 32 to 34 are diagrams for explaining a synchronization procedure and a beam scanning procedure using a subarray concept according to a different embodiment of the present invention.

Referring to an example shown in FIG. 32, a horizontal axis of a matrix corresponds to a time slot and a vertical axis of the matrix corresponds to an antenna subarray. In case of a $0^{th}$ antenna subarray, a synchronization sequence is generated in a manner that a reference sequence $s_i$ is multiplied by a weight [1 1 1 1] during 4 time slots and the generated synchronization sequence is inputted to an RF chain. On the contrary, in case of a $1^{st}$ antenna subarray, a synchronization sequence is generated in a manner that a reference sequence is multiplied by a weight [1 1 −1 −1] during 4 time slots. In case of a $2^{nd}$ antenna subarray, a synchronization sequence is generated in a manner that a reference sequence is multiplied by a weight [1 −1 1 −1]. In case of a $3^{rd}$ antenna subarray, a synchronization sequence is generated in a manner that a reference sequence is multiplied by a weight [1 −1 −1 1]. In other word, a synchronization sequence can be generated by differently multiplying a weight while a reference sequence is fixed ($s_i \in C$) in every time slot for each of antenna subarrays. In this case, C corresponds to a set of reference sequences $s_i$ capable of being used for generating a synchronization sequence. For example, the C can be defined as C={$s_{25}$, $s_{29}$}. Referring to the example of FIG. 32, although the reference sequence is the same, since signatures are generated by multiplying weight values orthogonal to each other, a reception UE is able to distinguish the signatures from each other in a synchronization procedure and a beam scanning procedure.

Figures 33, 34:
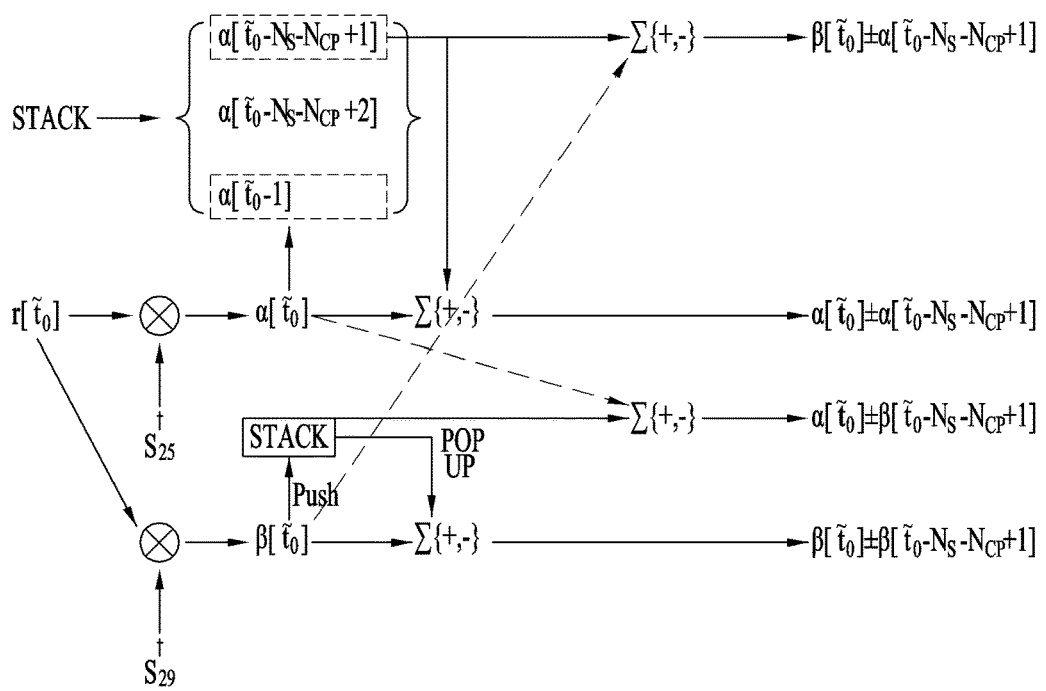

In FIG. 33, a further different embodiment is explained. Unlike FIG. 32, FIG. 33 illustrates an embodiment hat a reference sequence is differentiated according to a time slot. According to the embodiment of FIG. 33, a reference sequence for generating a synchronization sequence may vary according to a time slot. In this case, the same reference sequence can be applied to all antenna subarrays according to a time slot. For example, a synchronization sequence applied to a $0^{th}$ antenna subarray during 4 time slots corresponds to $[s_{i_0} \; s_{i_1} \; s_{i_2} \; s_{i_3}]$. On the contrary, a synchronization sequence applied to all antenna subarrays in a $1^{st}$ time slot corresponds to $[s_{i_1}^T \; s_{i_1}^T \; -s_{i_1}^T \; -s_{i_1}^T]^T$. In other word, in the embodiment of FIG. 33, the same reference sequence is used for generating a synchronization sequence for all antenna subarrays in each time slot. As mentioned earlier in FIG. 32, a reference sequence can be multiplied by a prescribed weight to generate the synchronization sequence. Meanwhile, in an example of FIG. 33, although a reference sequence is identically changed over a plurality of time slots, since weights are orthogonal to each other, similar to FIG. 32, a reception UE can distinguish signatures from each other in a synchronization procedure and a beam scanning procedure.

Meanwhile, a signature concept according to a combination of reference sequences is explained in more detail. As mentioned in the foregoing description, it is necessary for a UE to distinguish signals received in a synchronization procedure and/or a beam scanning procedure from each other. A combination of a synchronization signal and/or a beam scanning signal is defined as 'signature'. Since a UE is able to distinguish signatures different from each other, each of the signatures may correspond to specific information related to the synchronization procedure and/or the beam scanning procedure. For example, each of the signatures may indicate a cell ID or system information related to the cell ID. Or, each of the signatures may indicate a cell ID and information on a frequency band of a cell at the same time.

Meanwhile, when the number of reference sequences corresponds to N and a synchronization sequence is transmitted during M number of time slots, the maximum number of sequence combinations corresponds to $N^M$. In this case, the maximum number of differently defined signatures also corresponds to $N^M$. In this case, information corresponding to the total $M \log_2 N$ number of bits can be represented by the defined signatures.

For example, if a set of reference sequences is defined by $C=\{s_{25}, s_{29}\}$, a sequence combination capable of being generated over two time slots can be represented as equation 43 described in the following.

$$\{(i_0=25, i_1=25), (25,29), (29,25), (29,29)\} \quad \text{[Equation 43]}$$

In particular, since the number of sequences corresponds to 2 and the number of time slots corresponds to 2 in equation 43, the number of sequence combinations corresponds to 4. According to equation 43, 4 sequence combinations may correspond to 4 signatures different from each other and each of the signatures can be mapped to specific information (cell ID) according to equation 44 described in the following.

$$(i_0=25, i_1=25) \rightarrow \text{Cell ID 0}$$

$$(i_0=25, i_1=29) \rightarrow \text{Cell ID 1}$$

$$(i_0=29, i_1=25) \rightarrow \text{Cell ID 2}$$

$$(i_0=29, i_1=29) \rightarrow \text{Cell ID 3} \quad \text{[Equation 44]}$$

As a different example, if the number of reference sequences corresponds to 3 and a synchronization signal is transmitted during 4 time slots, it may be able to generate 81 sequence combinations ($N^M=3^4=81$) in total. In particular, it may be able to define 81 signatures in total.

FIG. 34 illustrates a synchronization procedure of a UE when a base station transmits a synchronization signal according to the embodiments mentioned earlier in FIGS. 32 and 33.

Equation 45 in the following shows an example for a case that a base station transmits a synchronization sequence during two time slots via two antenna subarrays. According to the example, a synchronization sequence is generated via a different reference sequence in every time slot according to FIG. 33.

$$\begin{bmatrix} s_{i_0} & s_{i_1} \\ s_{i_0} & -s_{i_1} \end{bmatrix} \quad \text{[Equation 45]}$$

Referring to equation 45, since it is able to change a reference sequence in every time slot, the synchronization procedure of the UE mentioned earlier in equation 24 is changed to equation 46 described in the following.

$$\{\hat{t}_0, \hat{i}, \hat{j}\} = \underset{\tilde{t}_0, i, j}{\operatorname{argmax}}\left[|s_i^H r[\tilde{t}_0]|^2 + |s_j^H r[\tilde{t}_1]|^2\right] \quad \text{[Equation 46]}$$

Compared to the equation 24, in equation 46, a sequence index of $(|s_i^H r[\tilde{t}_0]|^2)$ corresponding to a first correlation value is different from a sequence index of $(|s_j^H r[\tilde{t}_1]|^2)$ corresponding to a second correlation value. In particular, if $s_i, s_j \in C$ is satisfied, the number of sequences to be discovered at timing $t_0$ is increased to $|C|^2$ from $|C|$. And, if the number of time slots is increased to M, the total number of sequences to be discovered becomes $|C|^M$.

In particular, as the number of time slots of a synchronization procedure increases, the complexity of a receiver increases. A receiver structure for solving the complexity is shown in FIG. 34. The receiver structure shown in FIG. 34 corresponds to an extended form of a receiver structure shown in FIG. 11. A case of receiving two synchronization sequences $C=\{s_{25}, s_{29}\}$, $|C|=2$ during two time slots according to the equation 45 is explained as an example.

A proposed receiver includes two correlators to calculate a correlation between a reception signal and a synchronization sequence. The correaltors are represented by '⊗' in FIG. 34. Similar to the case of FIG. 11, the receiver shown in FIG. 34 stores a value calculated at one of the correlators in a stack (or, memory) and adds or subtracts (Σ) a value calculated at different timing in the same correlator to calculate a correlation value. In FIG. 34, if a value, which is calculated at a specific correlator and is stored in a stack, is used by the same correlator, the value is represented by a straight line. If the value is used by a different correlator, the value is represented by a dotted line. In particular, when a correlation value is calculated by a correlator at certain timing, the correlation value is stored in a stack and can be reused by two correlators different from each other at different timing.

Consequently, the receiver shown in FIG. 34 can calculate 4 correlation values using two correlators. In this case, since complexity of the receiver considerably changes according to the number of correlators, a difference between complexity of the receiver shown in FIG. 34 and complexity of the receiver shown in FIG. 11 is insignificant. In particular, the increase of the complexity of the receiver shown in FIG. 34 can be minimized while the $|C|^M$ number of correlation values are calculated.

Meanwhile, the synchronization procedure which is performed according to the embodiments mentioned earlier in FIGS. 32 to 34 may operate in a manner of being similar to the process mentioned earlier in FIG. 31. In particular, in FIGS. 32 to 34, while a single third precoder is fixed in a procedure of repeatedly transmitting a synchronization signal, a synchronization sequence is differently inputted in every time slot. In this case, a base station may change a reference sequence inputted to an RF chain corresponding to each antenna subarray according to a time slot. Or, the base station may generate a synchronization sequence by changing a weight multiplied with a reference sequence while the reference sequence is fixed over a time slot. Meanwhile, when a single fixed third precoder is configured, second precoders can be concatenated using a scheme mentioned earlier in FIG. 31 and embodiments thereof.

According to the aforementioned process, a UE can perform synchronization and obtain additional information (i.e., signature) indicated by a combination of synchronization sequences using a repeatedly received synchronization signal. In particular, a combination of reference sequences, which are selected and used in the course of transmitting a synchronization signal, can indicate additional information (e.g., cell ID information, frequency band information, or other system information) of a base station to be used in a synchronization procedure/beam scanning procedure. In particular, the UE checks a combination of synchronization sequences based on a received synchronization signal, obtains additional information corresponding to the checked combination, and utilizes the additional information for a following synchronization/beam scanning procedure.

5.3 Proposed Embodiment 3

Figure 36:
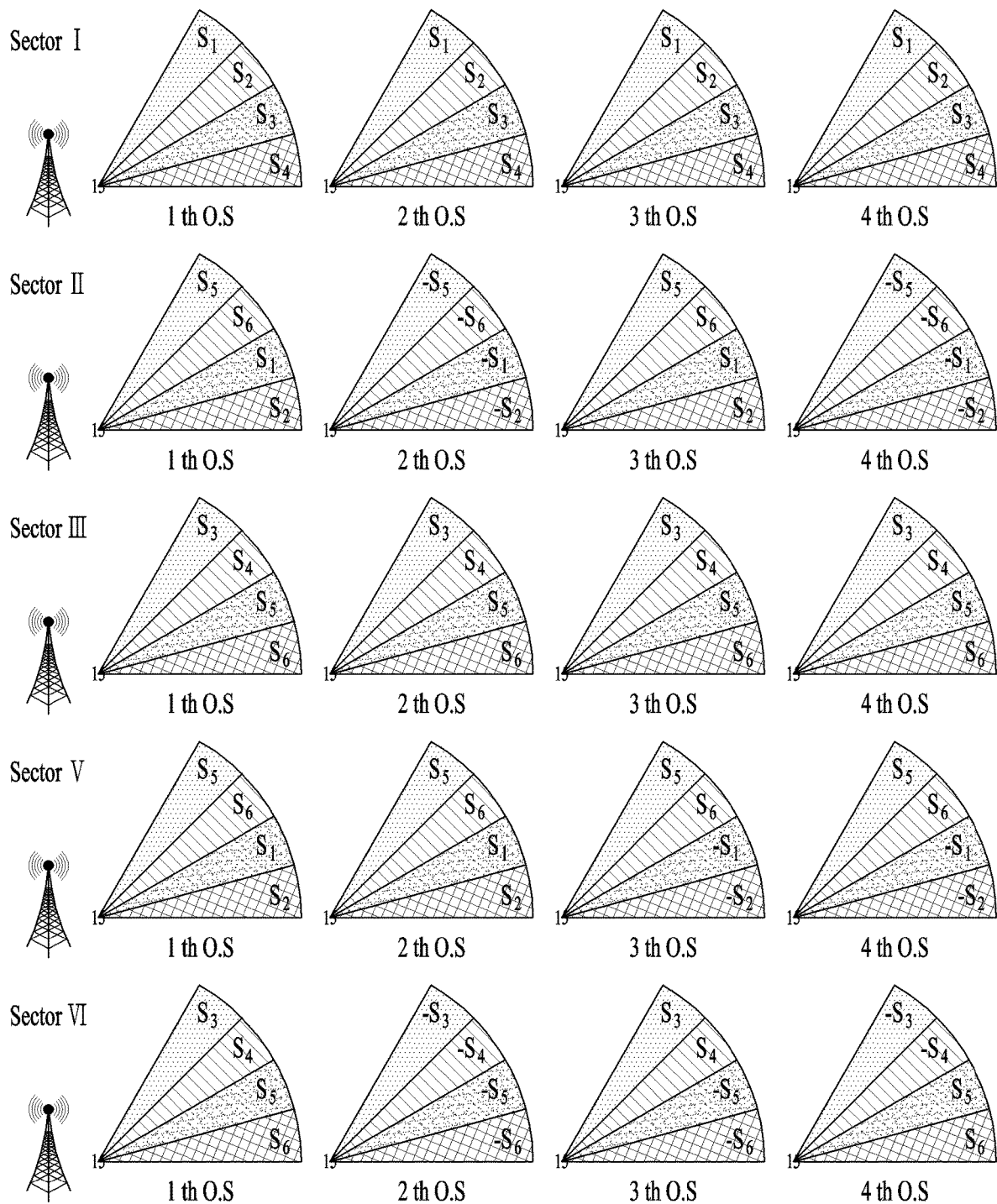
Figure 37:
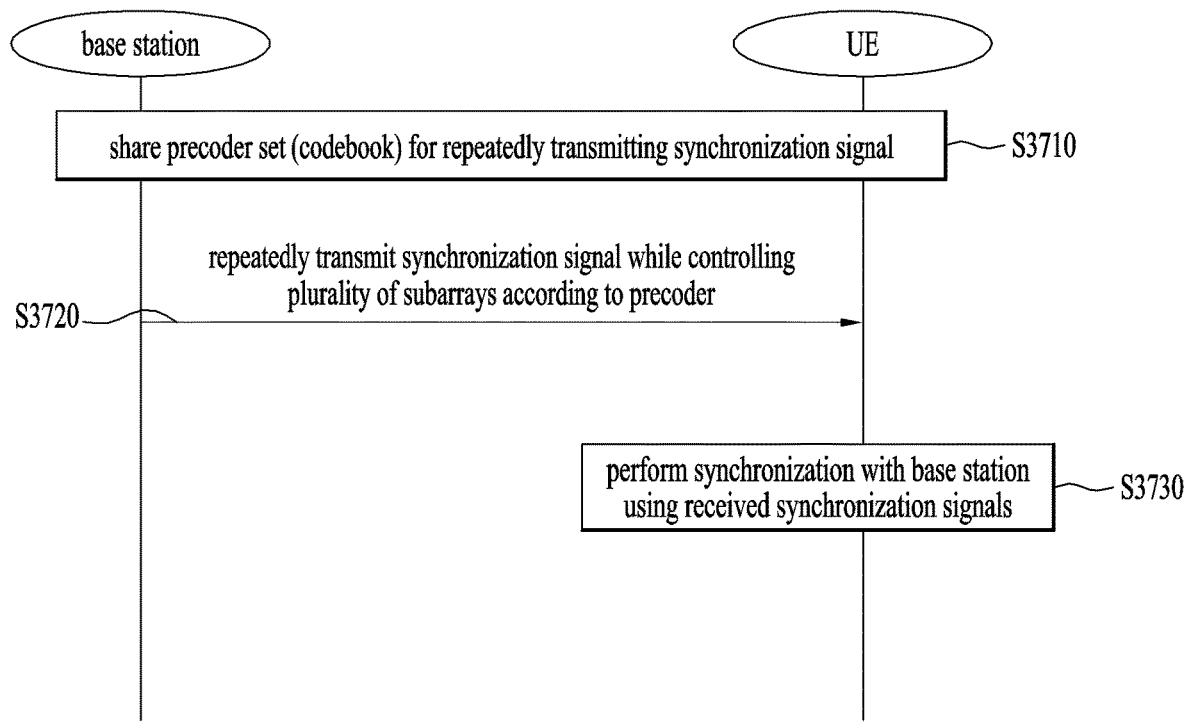
FIG. 37 is a flowchart for a synchronization procedure and a beam scanning procedure according to an embodiment of the present invention.

In the following, a further different embodiment of a synchronization procedure and a beam scanning procedure using a subarray concept is proposed with reference to FIGS. 35 to 37. Embodiments proposed in FIGS. 35 to 37 are applied to the beam broadening technique and the antenna subarray concept mentioned earlier in FIG. 28. In particular, according to the proposed embodiments, an AAS antenna structure including 16 antennas in total is configured by 4 antenna subarrays each of which includes 4 antennas. Since an independent RF chain is installed in each antenna subarray, each antenna array is controlled in a manner of being separated from a different RF chain. As a result, as mentioned in the foregoing description, each antenna subarray can transmit a beam in an independent direction. In the following, a precoder corresponding to each antenna subarray is defined by $p_0^{(8)}$, $p_1^{(8)}$, $p_2^{(8)}$, $p_3^{(8)}$. In this case, a coefficient size of each precoder is the same and a phase is different only.

A proposed new embodiment is different from the aforementioned embodiments in that a different reference sequence is used for all synchronization beams transmitted in the same sector. In particular, referring to FIG. 28, a precoder is fixed and an OCC applied to a sequence is differentiated according to a time slot. On the other hand, referring to the proposed new embodiment, an inputted sequence itself can be changed in every time slot. And, referring to the proposed embodiment, since an OCC applied to a sequence varies according to a sector, sectors can be distinguished from each other via the OCC. In particular, according to the proposed embodiment, sectors are distinguished from each other via the OCC and synchronization beams belonging to a sector are distinguished from each other via a sequence. In particular, the OCC applied to a sequence can be configured by a set of vectors orthogonal to each other. Or, the OCC can also be configured by a set of vectors quasi-orthogonal to each other.

FIG. 35 illustrates an example of configuring a synchronization signal sequence and an OCC according to a proposed embodiment. In FIG. 35, sectors I to VI correspond to sectors different from each other. The sectors I to VI are physically adjacent to each other according to an order shown in the drawing. For example, a sector II is adjacent to a sector I and a sector III in up and down direction and the sector I is adjacent to the sector II and a sector VI in up and down direction. In particular, the entire coverage of a base station is configured by sequentially and closely deploying 6 sectors in total.

In FIG. 35, 'Sequence' and 'OCC' correspond to reference sequences repeatedly inputted to each sector and an OCC applied to a reference sequence, respectively. In an example shown in FIG. 35, 4 reference sequences are defined for a single sector over 4 time slots in total. Each of the reference sequences corresponds to a different beam of a narrow beamwidth. Meanwhile, a relation between a sequence and an OCC shown in FIG. 35 can be shared in advance between a UE and a base station. Information on the relation can be shared together between the UE and the base station in the course of sharing a precoder set for repeatedly transmitting a synchronization signal.

In FIG. 35, it may commonly apply the same OCC to sequences for a sector or it may apply a different OCC according to a sequence. For example, a common OCC is applied to sequences for sectors I, II, III, and IV, whereas a different OCC is applied according to each of 2 sequences for sector V and VI. In particular, an OCC {++++} is applied to a sequence $s_5$, $s_6$ of the sector V, whereas an OCC {++−−} is applied to a sequence of $s_1$, $s_2$.

In FIG. 36, 4 narrow beams defined in each sector, a reference sequence corresponding to the narrow beams, and an OCC are depicted. FIG. 36 illustrates an implementation example of sectors I, II, III, V, and VI.

In FIG. 36, in case of a sector II, 4 reference sequences $\{s_5, s_6, s_1, s_2\}$ correspond to 4 narrow beams, respectively, in the sector. And, the OCC {+−+−} shown in FIG. 35 is applied to the reference sequences over 4 OFDM symbols (i.e., time slots). In particular, all reference sequences are multiplied by 1 in a first OFDM symbol and a third OFDM symbol to transmit a synchronization sequence. On the other hand, all reference sequences are multiplied by −1 in a second OFDM symbol and a fourth OFDM symbol to transmit a synchronization sequence.

Meanwhile, referring to FIG. 36, narrow beams positioned at the end of up/down direction of the sector II (narrow beams corresponding to reference sequences $s_5$ and $s_2$) are adjacent to a narrow beam positioned at the end of down direction of the sector I and a narrow beam positioned at the end of up direction of the sector III, respectively. This is because, as mentioned earlier in FIG. 35, the sectors I, II, and III are deployed in a manner of being physically adjacent to each other. Hence, a reference sequence, which is inputted to a narrow beam positioned at the end of up/down direction of a sector, uses a sequence different from a reference sequence inputted to a narrow beam of an adjacent sector to distinguish a beam of the sector from a beam of the adjacent sector. For example, a reference sequence $s_5$ inputted to a beam of the end of up direction of the sector II is different from a reference sequence $s_4$ inputted to a beam of the end of down direction of the sector I. Similarly, a reference sequence $s_2$ inputted to a beam of the end of down direction of the sector II is different from reference sequence $s_3$ inputted to a beam of the end of up direction of the sector III. Of course, an OCC applied to the sector II is different from an OCC applied to the sectors I and III.

As an exceptional embodiment, if narrow beams adjacent to each other belonging to a different sector use a different OCC, the same reference sequence can be inputted to a region corresponding to the two narrow beams. In particular, in FIG. 36, as an OCC, {++++} can be applied to a region corresponding to $s_4$ of the sector I. Meanwhile, since {+−+−} is applied to a region corresponding to $s_5$ of the sector II corresponding to a narrow beam region adjacent to the region, although the same reference sequence is inputted to the regions corresponding to the two narrow beams, a UE is able to distinguish the beams from each other. In this case, it may be able to use the same reference sequence depite of the adjacent narrow beam region.

In the following, a detail operating procedure according to a proposed embodiment is explained with reference to FIG. 37. A synchronization procedure and a beam scanning procedure according to the aforementioned embodiment may operate according to the procedures mentioned earlier in FIG. 31 and FIGS. 32 to 34. In particular, a precoder set (i.e., codebook) for repeatedly transmitting a synchronization signal is shared in advance between a base station and a UE [S3710].

Subsequently, a sequence (the aforementioned reference sequence) for performing synchronization is differently inputted according to a time slot while a single third precoder is fixed in the synchronization procedure and the beam scanning procedure [S3720]. In this case, a different sequence is repeatedly inputted over a plurality of time slots according to an antenna subarray corresponding to each narrow beam in a sector. And, an OCC is differently applied to a sequence according to a sector to distinguish synchronization sequences from each other between sectors. Meanwhile, when a single fixed third precoder is configured, the scheme mentioned earlier in FIGS. 31 to 34 can be similarly applied to a scheme of concatenating second precoders.

According to the aforementioned procedure, a UE can perform the synchronization procedure and the beam scanning procedure using a sequence of a repeatedly received synchronization signal and an OCC. Specifically, the UE firstly estimates timing synchronization by receiving a synchronization signal and selects an OCC having a greatest correlation result. As mentioned in the foregoing description, it may be able to determine a sector via the OCC. Subsequently, the UE estimates a sequence of the synchronization signal to check both a synchronization sequence and an OCC used for generating the received synchronization signal. Since the synchronization sequence corresponds to a specific region corresponding to a narrow beam in the sector, the UE, which has checked the synchronization sequence, is able to know a location of the UE in the sector corresponding to the sequence. Hence, the beam scanning procedure can be completed. For example, if the sequence estimated by the UE corresponds to $s_4$ and the OCC corresponds to {+−+−}, the UE can determine a sector VI and a region corresponding to a second narrow beam with reference to the relation between the sequence and the OCC obtained in the step S3710 [S3730].

Moreover, if additional information corresponds to a combination between the synchronization sequence and the OCC, as mentioned earlier in FIGS. 32 to 34, the additional information can also be forwarded to the UE (i.e., signature). As mentioned earlier in FIGS. 32 to 34, when a reference sequence and an OCC are combined to select and transmit a synchronization signal, the combination can indicate additional information on a base station (e.g., cell ID information, frequency band information, or other system information) to be used for the synchronization procedure and the beam scanning procedure. Hence, the UE checks the synchronization sequence and the OCC based on the received synchronization signal, obtains additional information corresponding to the checked combination, and can utilize the information for a following synchronization/beam scanning procedure.

Since the aforementioned embodiment is similar to the scheme mentioned earlier in FIGS. 32 to 34 except a point that a scheme of specifying a sector and a narrow beam is different, complexity of the UE is the same in the two schemes. Meanwhile, according to the present embodiment, since a different reference sequence is used according to a narrow beam in the same sector, it may be able to minimize the occurrence of a nulling phenomenon due to inter-beam interference.

5. Apparatus Configuration

Figure 38:
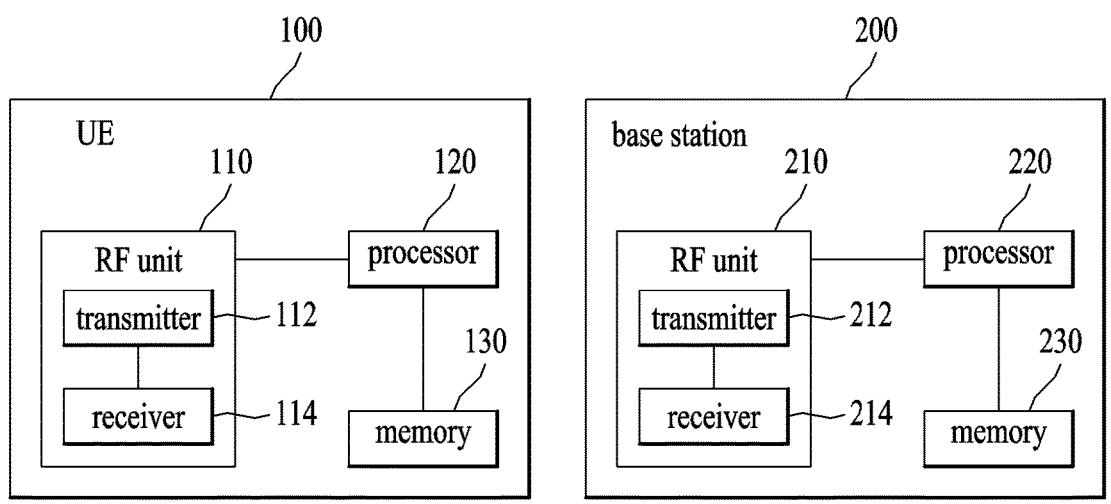
FIG. 38 is a diagram for configurations of a UE and a base station according to an embodiment of the present invention.

FIG. 38 is a block diagram showing the configuration of a user equipment and a base station according to one embodiment of the present invention. In FIG. 38, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 38, a communication environment may be established between a plurality of user equipment and the base station. In addition, the base station 200 shown in FIG. 38 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned method of performing synchronization can be applied not only to 3GPP LTE and LTE-A system but also to various wireless communication systems including an IEEE 802.16x system and IEEE 802.11x system. Further, the proposed method can also be applied to an mmWave communication system using super-high frequency band.

What is claimed is:

1. A method for a base station to transmit a signal in a wireless communication system, the method comprising:
generating each of a plurality of synchronization signals from each of a plurality of reference sequences corresponding to each of a plurality of antenna subarrays,
wherein the each of the plurality of the reference sequences is multiplied by each of a plurality of weights corresponding to the each of the plurality of the antenna subarrays,
wherein the each of the plurality of weights is defined in a plurality of time slots, and
wherein the each of the plurality of reference sequences corresponding to the each of the plurality of the antenna subarrays is same in the plurality of the time slots;
transmitting each of the plurality of the synchronization signals in the plurality of the time slots via the each of the plurality of the antenna subarrays,
wherein the base station allocates a resource to a user equipment (UE) in a plurality of sectors,
wherein each of the plurality of the sectors is divided into a plurality of narrow beams,
wherein the each of the plurality of the antenna subarrays corresponds to each of the plurality of the narrow beams,
wherein the each of the plurality of sectors corresponds to different weights,
wherein one of the plurality of sectors corresponds to a same weight,
wherein reference sequences for the one of the plurality of sectors is different for each of a plurality of antenna subarrays belonging to the one of the plurality of sectors, and
wherein the base station informs the UE about a region corresponding to one of the plurality of sectors and one of the plurality of narrow beams by information about a combination between the plurality of the reference sequences and the plurality of the weights.

2. The method of claim 1, wherein the information about the combination comprises at least one of cell ID information of the base station, frequency band information, and system information.

3. The method of claim 1, wherein each of the plurality of the antenna subarrays is independently controlled by a first precoder and performs beamforming of each of the plurality of the synchronization signals.

4. The method of claim 1, wherein each of the plurality of the antenna subarrays corresponds to an RF (radio frequency) chain of the base station.

5. A base station transmitting a signal in a wireless communication system, the base station comprising:
a transceiver; and
a processor operatively connected to the transceiver,
wherein the processor is configured to:
generate each of a plurality of synchronization signals from each of a plurality of reference sequences corresponding to each of a plurality of antenna subarrays,
wherein the each of the plurality of the reference sequences is multiplied by each of a plurality of weights corresponding to the each of the plurality of the antenna subarrays,
wherein the each of the plurality of weights is defined in a plurality of time slots, and
wherein the each of the plurality of reference sequences corresponding to the each of the plurality of the antenna subarrays is same in the plurality of the time slots;
transmit each of the plurality of the synchronization signals in the plurality of the time slots via the each of the plurality of the antenna subarrays,
wherein the base station allocates a resource to a user equipment (UE) in a plurality of sectors,
wherein each of the plurality of the sectors is divided into a plurality of narrow beams,
wherein the each of the plurality of the antenna subarrays corresponds to each of the plurality of the narrow beams,
wherein the each of the plurality of sectors corresponds to different weights,
wherein one of the plurality of sectors corresponds to a same weight,
wherein reference sequences for the one of the plurality of sectors is different for each of a plurality of antenna subarrays belonging to the one of the plurality of sectors, and
wherein the base station informs the UE about a region corresponding to one of the plurality of sectors and one of the plurality of narrow beams by information about a combination between the plurality of the reference sequences and the plurality of the weights.

6. The base station of claim 5, wherein the information about the combination comprises at least one of cell ID information of the base station, frequency band information, and system information.

7. The base station of claim 5, wherein each of the plurality of the antenna subarrays is independently controlled by a first precoder and performs beamforming of each of the plurality of the synchronization signal.

8. The base station of claim 5, wherein each of the plurality of the antenna subarrays corresponds to an RF (radio frequency) chain of the base station.

* * * * *